US011916357B2

(12) United States Patent
Resnick

(10) Patent No.: US 11,916,357 B2
(45) Date of Patent: Feb. 27, 2024

(54) SPARK PLUG WITH MECHANICALLY AND THERMALLY COUPLED CENTER ELECTRODE

(71) Applicant: EcoPower Spark, LLC, Mesquite, NV (US)

(72) Inventor: David Resnick, Mesquite, NV (US)

(73) Assignee: EcoPower Spark, LLC, Mesquite, NV (US)

( * ) Notice: Subject to any disclaimer, the term of this patent is extended or adjusted under 35 U.S.C. 154(b) by 0 days.

(21) Appl. No.: 18/106,433

(22) Filed: Feb. 6, 2023

(65) Prior Publication Data

US 2023/0187910 A1 Jun. 15, 2023

Related U.S. Application Data

(63) Continuation-in-part of application No. 17/956,144, filed on Sep. 29, 2022, which is a continuation-in-part of application No. 17/396,149, filed on Aug. 6, 2021, now Pat. No. 11,581,708.

(60) Provisional application No. 63/062,917, filed on Aug. 7, 2020.

(51) Int. Cl.
*H01T 13/34* (2006.01)
*H01T 13/39* (2006.01)

(52) U.S. Cl.
CPC ............. *H01T 13/34* (2013.01); *H01T 13/39* (2013.01)

(58) Field of Classification Search
CPC ......... H01T 13/39; H01T 13/08; H01T 13/16; H01T 13/38
See application file for complete search history.

(56) References Cited

U.S. PATENT DOCUMENTS

| | | | |
|---|---|---|---|
| 2,194,251 | A | 3/1940 | Walter et al. |
| 2,460,022 | A | 1/1949 | McCarthy et al. |
| 2,630,107 | A | 3/1953 | Field |

(Continued)

FOREIGN PATENT DOCUMENTS

| | | |
|---|---|---|
| CA | 1268020 | 4/1990 |

OTHER PUBLICATIONS

Multispark, LLC, LinkedIn, About: Overview, Multispark LLC is a developer of the PowerSTAR Performance Spark Plugs, pp. 2, (Retrieved Feb. 28, 2022), <https://www.linkedin.com/company/multispark-llc/about/>.

Brad Graves, "Motocycle Ride Ignites Dream to Bring Spark Plugs to Market," San Diego Business Journal, pp. 5 (Feb. 14, 2011). <https://www.sdbj.com/news/2011/feb/14/motorcycle-ride-ignites-dream-bring-spark-plugs-ma/>.

(Continued)

*Primary Examiner* — Kevin Quarterman
(74) *Attorney, Agent, or Firm* — Dicke, Billig & Czaja, PLLC

(57) ABSTRACT

A spark plug including a terminal end, a firing end, an axial centerline extending between the terminal end and the firing end, and an insulative core extending between the terminal end and the firing end. The insulative core includes a central bore coincident with the axial centerline extending through the insulative core, and an insulative nose extending along the axial centerline at the firing end of the insulative core, the insulative nose having an axial length and defining an end surface of the insulative core, wherein a cross-sectional area of the insulative nose perpendicular to the axial centerline varies along the axial length of the insulative nose with a cross-sectional area along at least a portion of the axial length being less than a surface area of the end surface so that a perimeter surface along the portion of the axial length of the insulative nose has a concave profile.

20 Claims, 23 Drawing Sheets

(56) References Cited

U.S. PATENT DOCUMENTS

| | | | |
|---|---|---|---|
| 2,680,432 | A | 6/1954 | Rand |
| 3,012,084 | A | 12/1961 | Fisher |
| 3,449,613 | A | 6/1969 | Testerini |
| 4,684,352 | A | 8/1987 | Clark et al. |
| 5,577,471 | A | 11/1996 | Ward |
| 5,892,319 | A | 4/1999 | Rossi |
| 6,628,049 | B2 | 9/2003 | Rosenthal et al. |
| 8,348,709 | B1 | 1/2013 | Passman et al. |
| 8,933,618 | B2 | 1/2015 | Sakakura |
| 9,780,534 | B2 | 10/2017 | Chirila |
| 10,090,647 | B2 | 10/2018 | Chirila |
| 11,581,708 | B2 | 2/2023 | Resnick |
| 2009/0072694 | A1 | 3/2009 | Steigleman, Jr. et al. |
| 2013/0134857 | A1 | 5/2013 | Shimamura et al. |
| 2018/0019578 | A1 | 1/2018 | Mukoyama et al. |
| 2022/0045485 | A1 | 2/2022 | Resnick |
| 2023/0028253 | A1 | 1/2023 | Resnick |
| 2023/0238781 | A1 | 7/2023 | Resnick |
| 2023/0253765 | A1 | 8/2023 | Resnick |

OTHER PUBLICATIONS

V-Twin Forum, Technical Discussion Forums, "Power Star Spark Plugs," p. 11 (Retrieved Feb. 28, 2022). <https://www.v-twinforum.com/threads/power-star-spark-plugs.172416/>.

PowerSTARSparkplugs, Automotive Parts Store, PowerSTARSpark Plugs—Home | Facebook, pp. 9 (Retrieved Feb. 28, 2022) <https://www.facebook.com/PowerSTARSparkplugs/>.

International Search Report and the Written Opinion of the International Searching Authority for International Application No. PCT/US2021/045126 dated Feb. 24, 2022, (10 pages).

Office Action for U.S. Appl. No. 17/396,149 dated Mar. 31, 2022 (18 pgs).

Notice of Allowance for U.S. Appl. No. 17/396,149 dated Sep. 27, 2022 (7 pgs).

SPARK PLUG WITH MECHANICALLY AND THERMALLY COUPLED CENTER ELECTRODE

CROSS-REFERENCE TO RELATED APPLICATIONS

This is a Continuation-in-Part of U.S. patent application Ser. No. 17/956,144, filed Sep. 29, 2022, pending, entitled “SPARK PLUG WITH MECHANICALLY AND THERMALLY COUPLED CENTER ELECTRODE,” which is a Continuation-in-Part of U.S. patent application Ser. No. 17/396,149, filed Aug. 6, 2021, now allowed, entitled “SPARK PLUG WITH THERMALLY COUPLED CENTER ELECTRODE,” which claims the benefit of the filing date of U.S. Provisional Patent Application Ser. No. 63/062,917, filed Aug. 7, 2020, entitled “SPARK PLUG WITH THERMALLY COUPLED CENTER ELECTRODE,” the entire teachings of which are incorporated herein by reference.

BACKGROUND

Spark plugs are employed in combustion chambers of combustion systems, such as within the cylinders of internal combustion engines of vehicles, for example, to ignite a pressurized air-fuel mixture therein. To increase the operational lifetime of spark plugs, hard metals, such as platinum and iridium, for example, have been increasingly used in place of nickel-copper alloys for spark plug electrodes. However, spark plugs employing such metals are costly and, in some cases, may reduce engine performance relative to so-called nickel spark plugs.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

Figure 1B:
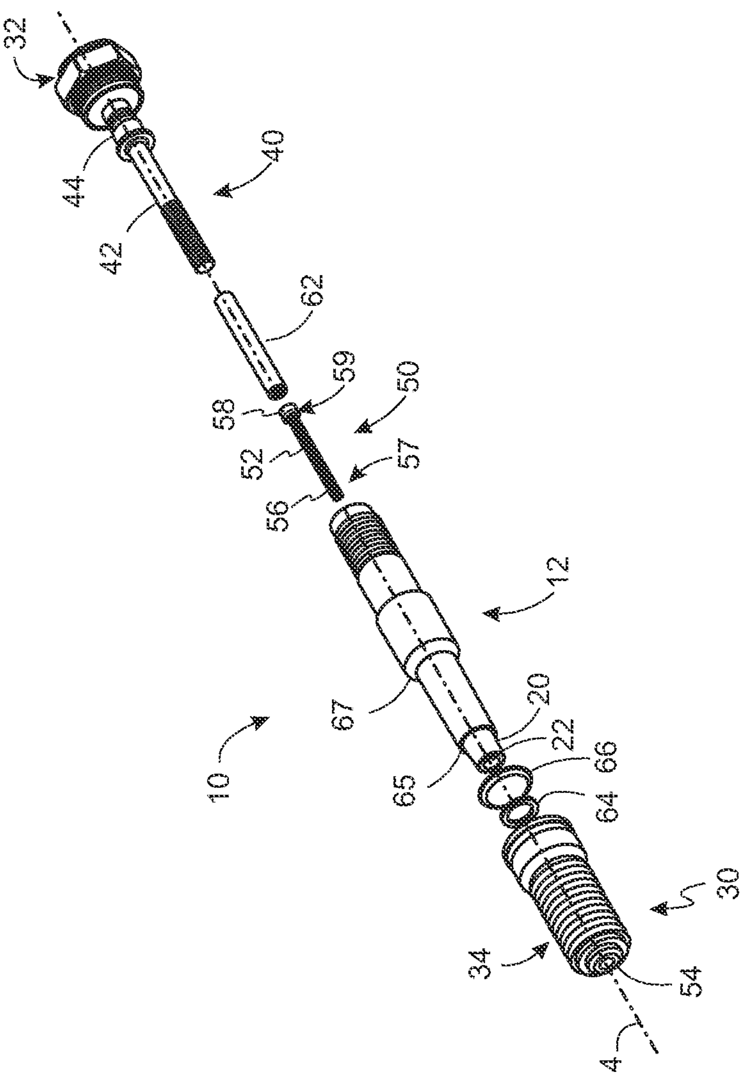
FIG. 1B is an exploded view of a spark plug, in accordance with one example.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Spark plugs are employed in combustion chambers of combustion systems, to ignite a pressurized air-fuel mixture therein, such as within the cylinders of internal combustion engines of vehicles, for example. Spark plugs typically include a central electrode disposed within a generally cylindrical or tubular insulative core (e.g., ceramic), and a metal casing or shell concentrically disposed about a perimeter of at least a portion of the insulative core, wherein the metal shell includes a side electrode that forms a spark gap with the center electrode at a firing end of the spark plug. When the spark plug is installed in a combustion system (e.g., screwed into a cylinder head), a portion of the firing end is disposed within the combustion chamber such that a controlled voltage applied across center and side electrodes causes controlled sparking across the spark gap to ignite the air-fuel mixture therein.

Electrical fields along a surface of a charged conductor are strongest at locations having the greatest surface charge density, such as along a sharp edge or at a point, for example. With this in mind, a firing end of the center electrode is typically formed with sharp perimeter edges and a small diameter (so as to be point-like), wherein, generally, the smaller the diameter the lower the voltage required to cause a spark across the spark gap between the sharp perimeter edges of the center electrode and sharp edges of the side electrode.

While there are a number of spark plug types available, the most common are nickel spark plugs, platinum spark plugs, and iridium spark plugs. Nickel spark plugs employ a center electrode having a copper core about which a nickel alloy is fused, particularly at the electrode head (e.g., 2.5 mm in diameter). While highly electrically and thermally conductive, a nickel alloy is a relatively soft material. Consequently, the electrode head tends to wear down relatively quickly from repeated high-voltage sparking at a same point under the high pressure, high temperature, and corrosive conditions within a combustion chamber. As the electrode head erodes, its sharp edges are lost and the spark gap widens, thereby requiring a higher voltage to elicit a spark (i.e., a higher breakdown voltage). Electrode head erosion often leads to spark plug fouling and reduced engine performance (e.g., engine misfiring). As a result, known nickel spark plugs need to be replaced relatively frequently (e.g., every 20,000 miles).

Platinum and iridium spark plugs also employ a copper core center electrode wire having a nickel-alloy tip. However, in the case of platinum spark plugs, a small platinum disk (e.g., 1.1 mm in diameter) is welded to the nickel-alloy tip of the center electrode wire. Similarly, in the case of iridium spark plugs, an iridium "wire" (e.g., 0.4 mm in diameter) is welded to the nickel-alloy tip of the center electrode wire. Platinum and iridium are part of the "platinum group" of precious metals, which are known for their hardness and their chemically non-reactive nature. Because platinum and iridium are harder materials than nickel-alloys, platinum and iridium spark plugs hold their edges and maintain their gaps longer than nickel spark plugs and, thus, have a longer lifetime (e.g., 50,000 miles for platinum, and 100,000 miles for iridium). Even though platinum and iridium spark plugs are more expensive, they do not provide the same performance level as conventional nickel spark plugs. However, due to their extended lifetimes, the use of platinum and iridium spark plugs continues to increase and has replaced the use of nickel spark plugs in many applications.

According to examples which will be described in greater detail herein, the present disclosure provides a spark plug having a large center electrode head (e.g., 8 mm in diameter) which may be formed from non-precious metals (including nickel-alloys traditionally used for nickel spark plugs), wherein a perimeter edge of the large center electrode head forms a circumferential spark gap with a circumferentially extending side electrode formed by the metal shell of the spark plug. The disclosed spark plug is lower in cost and provides improved performance (e.g., faster combustion, improved torque, increased efficiency, better fuel economy) relative to platinum and iridium spark plugs, while having a lifetime similar to that of iridium spark plugs (e.g., 100,000 miles). Previous attempts have been made at developing spark plugs employing large electrode heads comprising non-precious metals. However, such known attempts have physically failed during operation and/or have failed to achieve lifetimes approaching those of iridium spark plugs primarily due to thermal issues. It is noted that due to high material costs, it is generally cost-prohibitive to manufacture large electrode heads of precious metals, such as iridium and platinum, and, in fact, tend to motivate the use of small electrode heads.

Figure 1A:
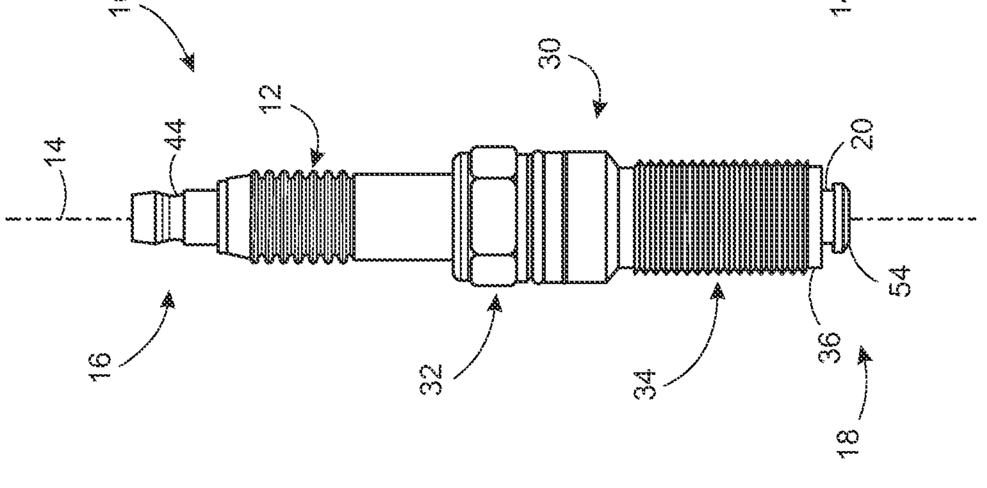
FIG. 1A is a side view of a spark plug, in accordance with one example.

FIGS. 1A and 1B are renderings respectively illustrating side and exploded views of an example spark plug 10, in accordance with the present disclosure. Spark plug 10 includes a generally cylindrical insulative core 12 extending along an axial centerline 14 from a terminal end 16 to a firing end 18, the insulative core 12 including an insulative nose 20 at firing end 18 and a central bore 22 extending axially there through. A metal shell 30 concentrically encases a portion of cylindrical insulative core 12. In one example, the metal shell 30 includes a nut 32 (e.g., a hex nut) and a tube-like threaded sleeve 34. Metal shell 30 serves as a threaded bolt which is threaded into a 30 cylinder head when spark plug 10 is installed therein. In one example, threaded sleeve defines a side electrode 36 proximate to firing end 18, with metal shell 30 forming an electrically conductive path from side electrode 36 to the cylinder head when spark plug 10 is installed therein. In one example, as illustrated, side electrode 36 is a circumferentially extending perimeter electrode. It is noted that, in most applications, side electrode 36 serves as a ground electrode.

Spark plug 10 further includes a terminal electrode 40 and a center electrode 50 extending axially along axial centerline 14. Terminal electrode 40 includes a terminal wire 42 extending to a terminal stud 44 proximate to terminal end 16. In accordance with the present disclosure, spark plug 10 includes a center electrode 50 including a center electrode wire 52 and a center electrode head 54, where center electrode head 54 is threaded to center electrode wire 52. In one example, center electrode wire 52 includes male threads 56 at a first end 57 and a wire head 58 at an opposing second end 59, where male threads 56 are threaded to corresponding female threads 60 (see FIGS. 4B, 7B, and 7C) in center electrode head 54.

Figure 2A:
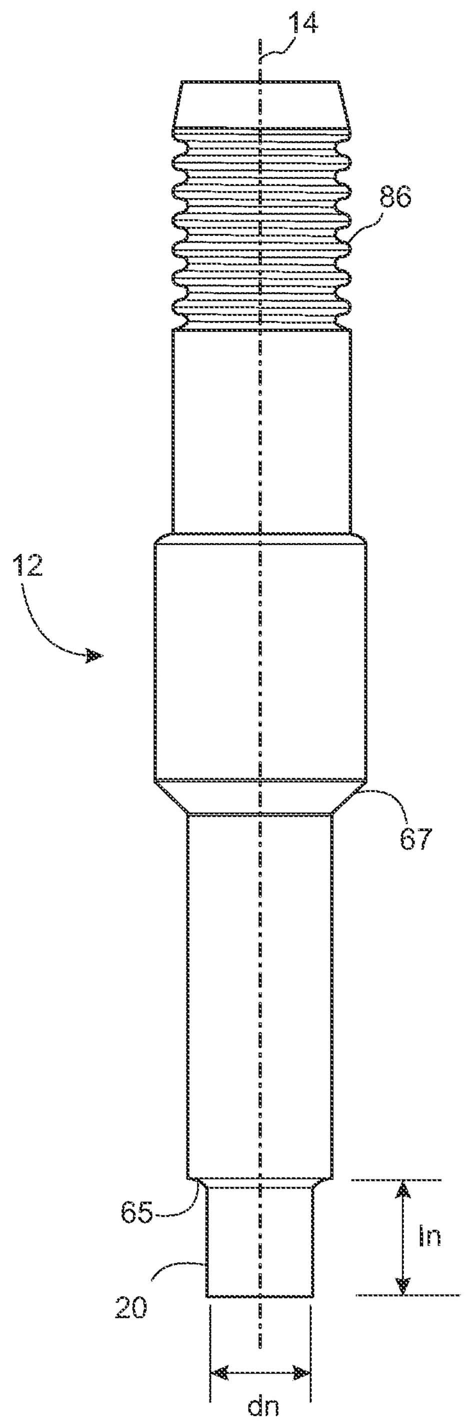
FIG. 2A is a side view of an insulative core, in accordance with one example.
Figure 2B:
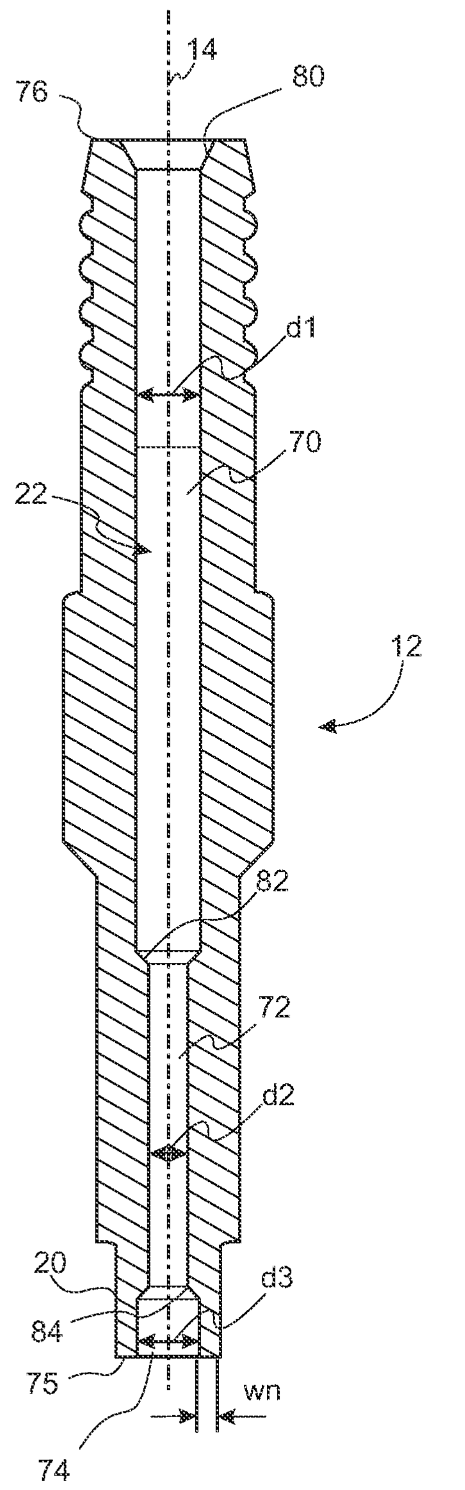
FIG. 2B is a cross-sectional view of an insulative core, in accordance with one example.
Figure 7A:
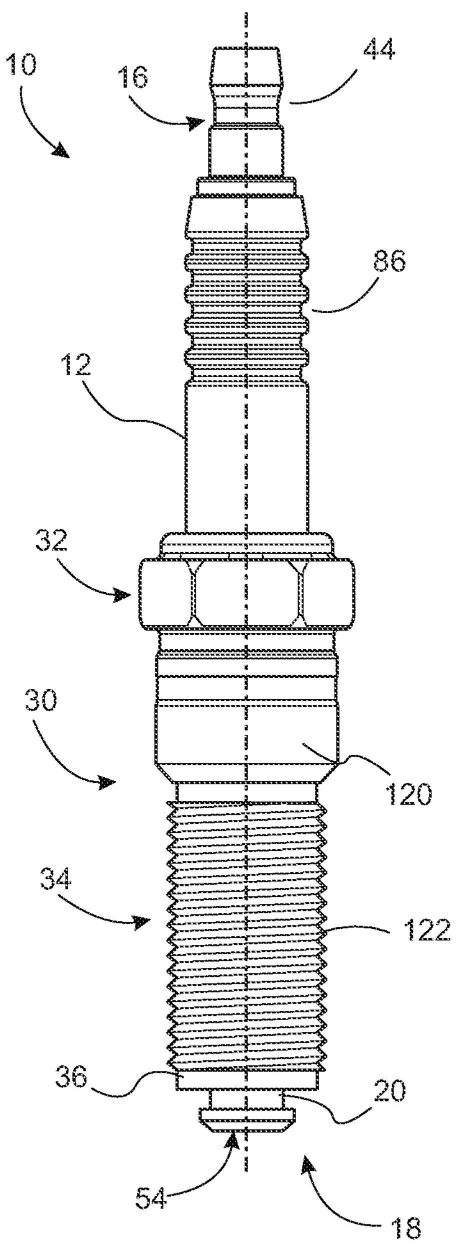
FIG. 7A is a side view of a spark plug, in accordance with one example.
Figure 7B:
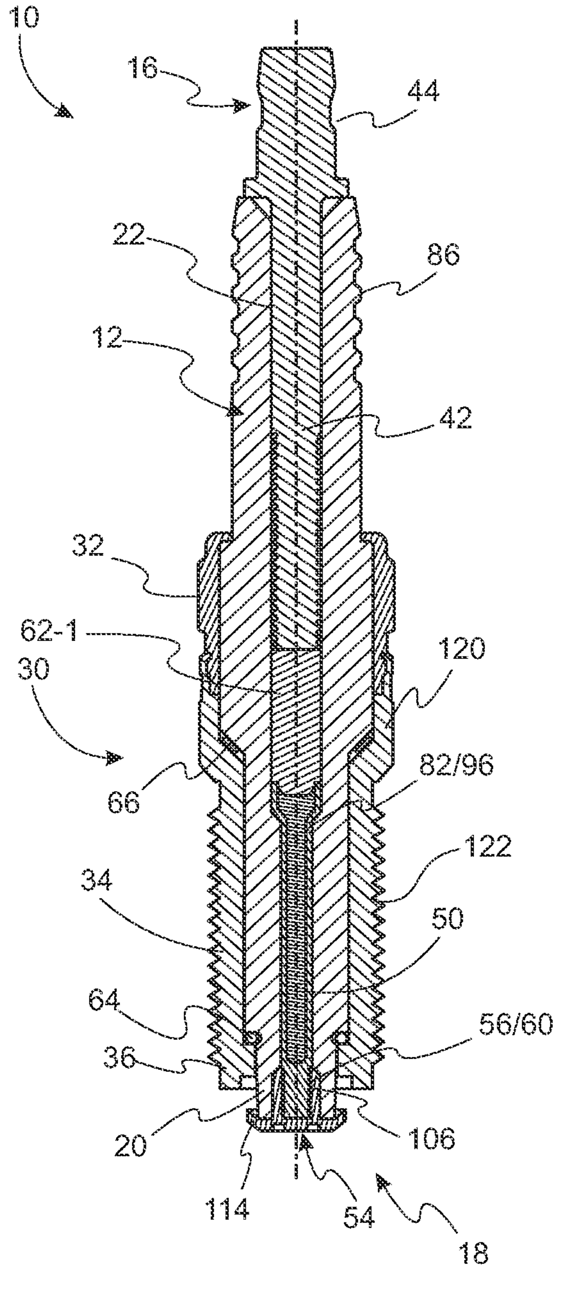
FIG. 7B is a cross-sectional view of a spark plug, in accordance with one example.

With continued reference to FIGS. 1A and 1B, according to one example, to assemble spark plug 10, center electrode wire 52 is inserted into central bore 22 of insulative core 12 via terminal end 16 until wire head 58 engages a tapered shoulder 82 within central bore 22 (see FIGS. 2B and 7B). A conductive glass powder 62 is disposed within central bore 22 from terminal end 16, followed by insertion of terminal wire 42 of terminal electrode 40 into central bore 22, with terminal wire 42 being employed to tamp glass powder 62. The assembly of the insulative core 12, center electrode wire 52, and terminal electrode 40 is then fired at high-temperatures to melt glass powder 62, where upon cooling, the melted glass powder 62 solidifies to form a solid glass lock 62-1 (see FIG. 7B) which locks terminal electrode 40 and center electrode 50 in place within insulative core 12, and which serves as an electrically conductive path between terminal electrode 40 and center electrode 50. In examples, solid glass lock 62-1 provides a resistance which dampens transmission of radio frequency interference.

Insulative core 12 is then inserted into threaded sleeve 34, with gaskets 64 and 66 respectively forming a seal between an interior surface of threaded sleeve 34 and shoulders 65 and 67 on insulative core 12 when nut 32 is fused with threaded sleeve 34 (e.g. via a thermal process). In one example, after nut 32 is fused with threaded sleeve 34, insulative nose 20 of insulative core 12 extends axially beyond side electrode 36, with threads 56 of first end 57 of center electrode wire 52 extending axially beyond insulative nose 20 so as to be exposed therefrom. In one example, center electrode head 54 is then coupled to center electrode wire 52, such as by threading.

By attaching center electrode head 54 to center electrode wire 52 after center electrode wire 52 has been installed within central bore 22 of insulative core 12, center electrode head 54 can be sized larger than the diameter of central bore 22. As will be described in greater detail below, a large center electrode head provides an increased linear edge length (e.g., a continuous circumferential edge) which increases the spark point diversity of the center electrode head when forming a spark gap with a corresponding side electrode extending from the metal shell. In-turn, the increased spark point diversity enables a spark plug, in accordance with the present disclosure, to utilize an enlarged center electrode head formed with nickel-alloys traditionally employed for nickel spark plug electrodes while providing improved engine performance and achieving lifetimes comparable to iridium spark plugs.

FIGS. 2A and 2B respectively illustrate side and cross-sectional views of insulative core 12, according to one example, and illustrate central bore 22 extending there through. In one example, central bore 22 includes a first portion 70 having a first diameter, d1, and a second portion 72 having a second diameter, d2, which is smaller than first diameter, d1, and a counter bore 74 having a third diameter, d3, which is disposed within insulative nose 20 proximate to firing end 18 in assembled spark plug 10, where third diameter, d3, is greater than second diameter, d2. Central bore 22 further includes a tapered shoulder region 80, at the entrance to central bore 22 proximate to terminal end 16 in assembled spark plug 10, a tapered shoulder region 82 at a transition from the diameter, d1, of the first portion 70 to the smaller diameter, d2, of second portion 72, and a tapered shoulder region 84 at a transition from counter bore 74 to the smaller diameter, d2, of second portion 72. Insulator nose 20 has an axial length, ln, and has an end surface 75 disposed concentrically about counter bore 74. Insulative core 12 further includes a corrugated region 86, proximate to terminal end 16 in assembled spark plug 10, which increases a surface distance between terminal stud 44 of terminal electrode 40 and nut 32 of metal shell 30 (see FIG. 1A) to reduce a potential for electrical arcing there between.

Figure 3A:
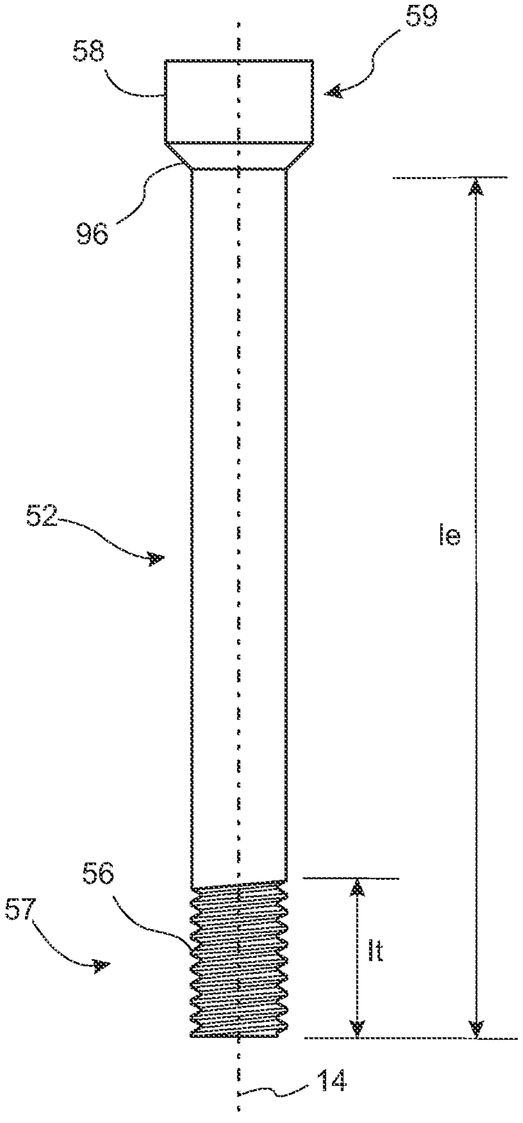
FIG. 3A is a side view of a center electrode wire, in accordance with one example.
Figure 3B:
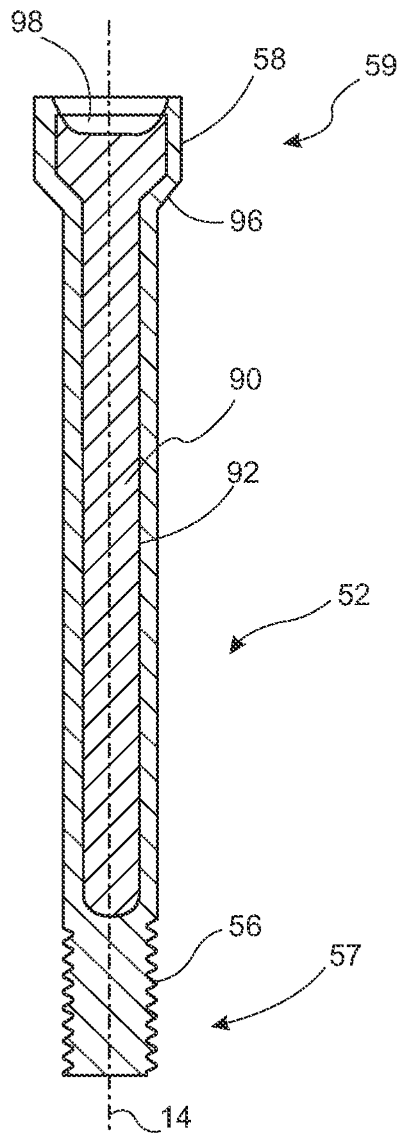
FIG. 3B is a cross-sectional view of a center electrode wire, in accordance with one example.

FIGS. 3A and 3B respectively illustrate side and cross-sectional views of center electrode wire 52, according to one example. In one example, center electrode wire 52 includes a copper core 90 with a nickel alloy 92 fused there about, including at first end 57 at which male threads 56 are disposed. In one example, second end 59 includes a shoulder region 96 where wire head 58 transitions to the smaller diameter electrode wire 52, where shoulder region 96 is configured to engage corresponding shoulder region 82 of insulative core 12 when installed within central bore 22 (see FIG. 7B). In one example, wire head 58 includes a recess or scooped-out region 98 to receive and be filled with conductive glass powder 62 (which is subsequently melted to form conductive glass lock 62-1, as illustrated by FIG. 7B). As illustrated, center electrode wire 52 has an electrode length, le, from shoulder 96 to first end 57, and threads 56 having a thread length, lt.

Figure 4A:
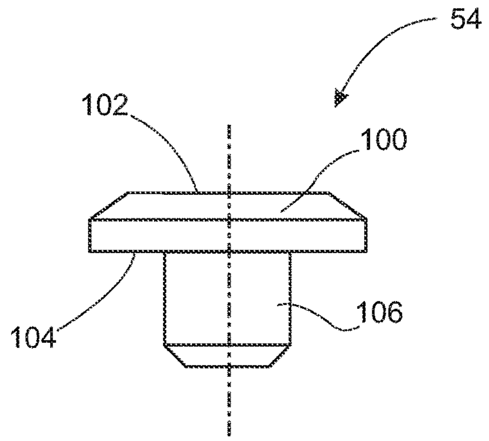
FIG. 4A is a side view of a center electrode head, in accordance with one example.
Figure 4B:
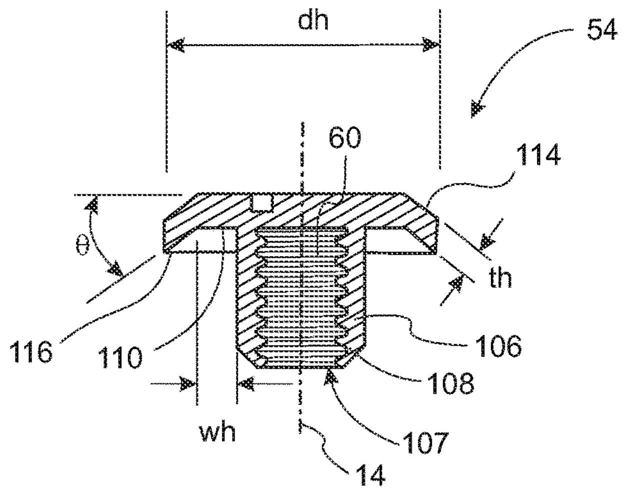
FIG. 4B is a cross-sectional view of a center electrode head, in accordance with one example.
Figure 4C:
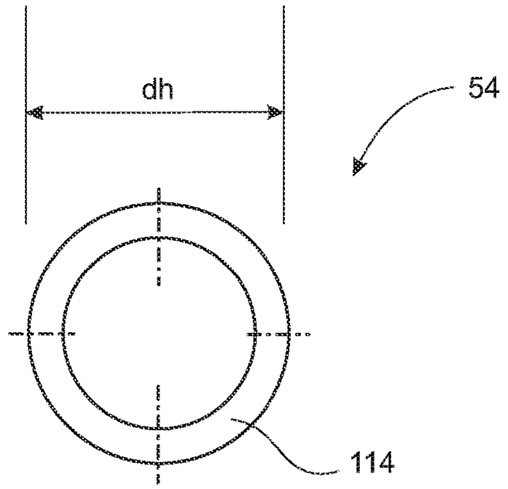
FIG. 4C is a top view of a center electrode head, in accordance with one example.

FIGS. 4A, 4B and 4C respectively illustrate side, cross-sectional, and top views of center electrode head 54, according to one example. In one example, center electrode head 54 includes an electrode plate 100 having an upper surface 102, and opposing lower surface 104, and a collar 106 extending from lower surface 104, with collar 106 including a collar bore 107 with internal threads 60 for threading with threads 56 at first end 57 of electrode wire 52 (see FIG. 3A). In one example, as illustrated, electrode plate 100 is disk-shaped. However, it is noted that electrode plate 100 is not limited to any particular shape nor is electrode plate 100 limited to a single plane. In examples, electrode plate 100 may be flat, convex, concave, circular, non-circular, or any suitable shape for a given implementation of spark plug 10.

Figure 7C:
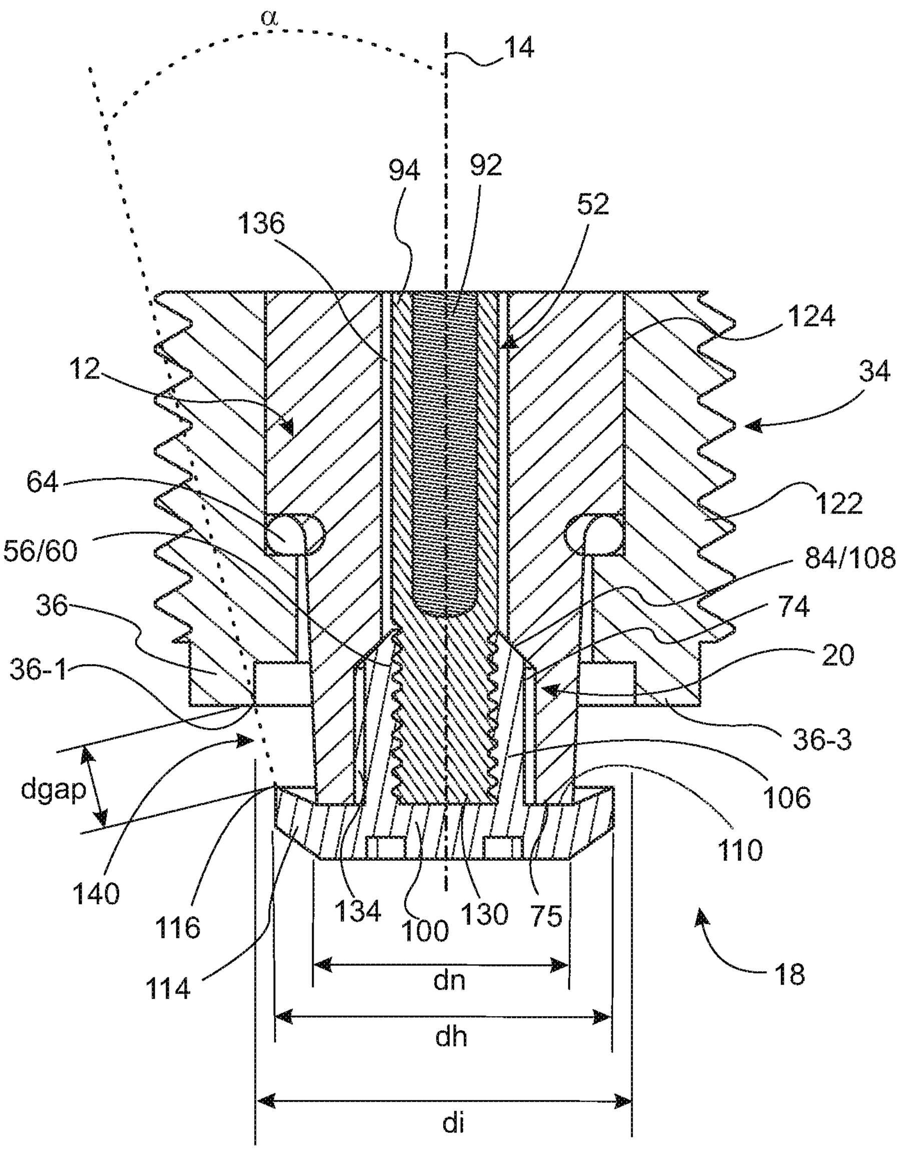
FIG. 7C is an enlarged cross-sectional view of a firing end of a spark plug, according to one example.

When threaded onto electrode wire 52, collar 106 is seated within counter bore 74 at insulative nose 20 of insulative core 12 such that a portion 110 of bottom surface 104 of electrode plate 100 surrounding collar 106 engages and is flush with end surface 75 of insulative nose 20 (see FIG. 7C). As used herein, the term "flush" means to be in direct contact with one another within a range of thermal expansion tolerances. In one example, a width, wh, of ring-like portion 110 of bottom surface 104 is the same as the width, wn, of the ring-like end surface 75 of insulated nose 20. In one example, end surface 75 of insulative nose 20 is planar. In other examples, end surface 75 is non-planar. In examples, end surface 75 has a shape which is a negative of the shape of portion 110 of bottom surface 104 of electrode plate 100 so that portion 110 of electrode plate 100 is seated flush with end surface 75 of insulative nose 20.

Figure 4D:
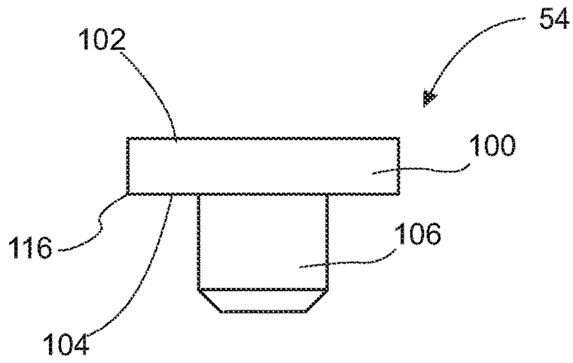
FIG. 4D is a side view of a center electrode head, in accordance with one example.

In one example, as illustrated, a circumferential edge 114 of electrode plate 100 is angled downward at a head angle, θ, from upper surface 102 toward lower surface 104 such that a spark gap distance, dgap, of a spark gap 140 formed between a circumferential edge 116 of lower surface 104 of electrode plate 100 and circumferentially extending side electrode 36 may vary depending on head angle, θ (see FIGS. 7B and 7C, for example). In one example, as illustrated, electrode plate 100 has a thickness, th, and a diameter, dh, which is greater than the diameter, dn, of insulative nose 20 so that circumferential edge 116 of lower surface 104 of electrode plate 100 extends radially beyond insulative nose 20 to form a spark gap 140 with side electrode 36 (see FIGS. 7A and 7B). In other examples, diameter, dh, of electrode head 54 may be less than diameter, dn, of insulative nose 20 but greater than the diameter, d2, of central bore 22. In one example, as illustrated by FIG. 4D, electrode plate 100 is planar (i.e., perimeter edge 114 is not angled).

Figure 5A:
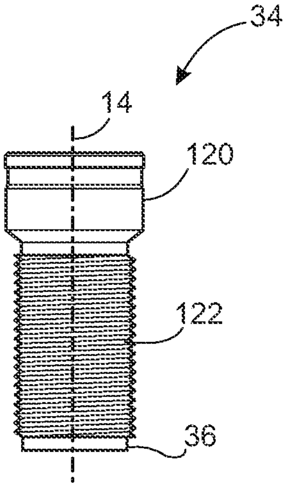
FIG. 5A is a side view of a threaded sleeve of a metal shell, in accordance with one example.
Figure 5B:
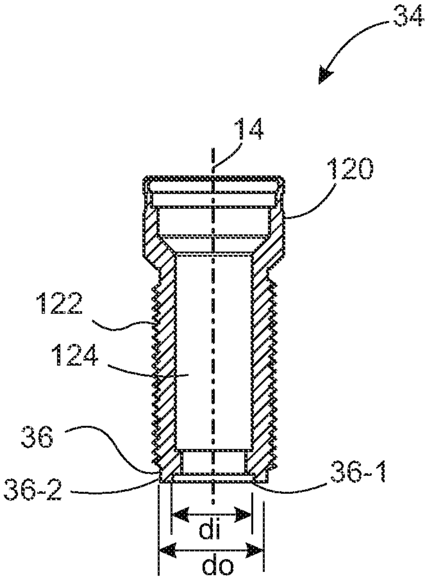
FIG. 5B is a cross-sectional view of a threaded sleeve of a metal shell, in accordance with one example.
Figure 5C:
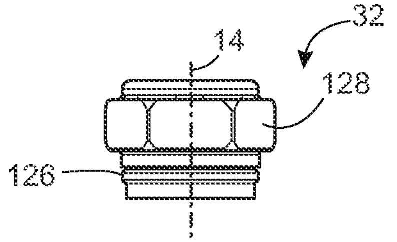
FIG. 5C is a side view of a nut of a metal shell, in accordance with one example.

FIGS. 5A and 5B respectively illustrate side and cross-sectional views of threaded sleeve 34, and FIG. 5C illustrates a side view of nut 32 of metal shell 30, according to one example. In one example, threaded sleeve 34 includes a collar 120 and threads 122 for threading assembled spark plug 10 into an engine cylinder head such that firing end 18 is disposed within a cylinder. Threaded sleeve 34 includes a bore 124 to receive insulative core 12, with collar 120 to receive and couple to a connection portion 126 of nut 32 (e.g., via thermal fusion). In one example, nut 32 includes a hexagonal engagement surface 128, such as for a socket or wrench, to assist in installation of assembled spark plug 10 in an engine cylinder head.

As illustrated, threaded sleeve 34 includes side electrode 36 axially extending from threaded region 122. In one example, as illustrated, side electrode circumferentially extends from threaded region 122 and is ring-like in shape with an inner diameter, di, formed by an inner perimeter edge 36-1 and an outer diameter, do formed by an outer perimeter edge 36-2. As will be described in greater detail below (see FIG. 7C), in one example, a perimeter edge of side electrode 36 forms a spark gap 140 with a perimeter edge of center electrode plate 100, such as circumferential edge 116 of center electrode plate 100 (see FIG. 4B). While side electrode 36 is illustrated as extending from and being formed as a contiguous part of a main body of threaded sleeve 34, in other examples, the term "extending from" encompasses implementations where side electrode 36 is an electrode which is coupled to and axially extends from threaded sleeve 34, such as via welding, for example.

Figure 6:
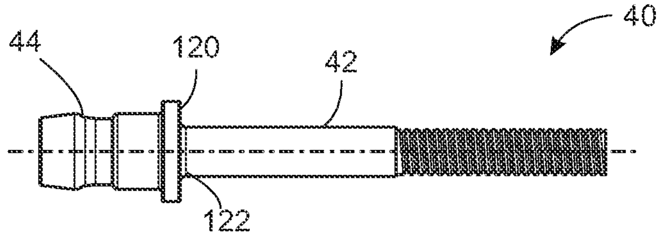
FIG. 6 is a side view of a terminal electrode, in accordance with one example.

FIG. 6 is a side view illustrating terminal electrode 40, according to one example. In one example, terminal electrode 40 includes a flange 120 and a tapered shoulder region 122 disposed between terminal wire 42 and terminal stud 44, where shoulder region 122 is to engage and seat within shoulder region 80 of insulative core 12, and flange 120 is to engage and be positioned flush with the end surface 76 of insulative core 12 when terminal electrode 40 is disposed within central core 22 of assembled spark plug 10 (see FIG. 2B).

FIGS. 7A and 7B respectively illustrate side and cross-sectional views of spark plug 10, and FIG. 7C illustrates an enlarged cross-sectional view of firing end 18 of spark plug 10, according to one example. As illustrated, insulative nose 20 extends axially beyond side electrode 36 of metal shell 30 at firing end 18, with the threaded end 57 of center electrode wire 52 being disposed within counter bore 74 of insulative nose 20. In other examples, insulative nose 20 does not extend axially beyond side electrode 36.

In one example, as illustrated, center electrode head 54 is threaded onto male threads 56 of center electrode wire 52 via female threads 60 disposed in collar 106 such that bottom surface 110 of electrode plate 100 is flush with the end surface 75 of insulative nose 20. In one example, threads 56/60 forming the threaded connection between center electrode wire 52 and electrode head 54 are locking threads which function to immobilize and secure the threaded connection to prevent center electrode head 54 from decoupling from center electrode wire 52 during operation of spark plug 10. Such locking threads include any suitable locking mechanism such as cold welding (e.g., thread galling), self-locking type threads (e.g., interference threads), and thread locking systems (e.g., adhesives), for example.

In one example, an end surface 130 of center electrode wire 52 is substantially flush with end surface 75 of insulative nose 20. In other examples, the length of center electrode wire 52 and depth of female threads 60 of center electrode head 54 may vary so long as bottom surface 110 of electrode plate 100 is flush with end surface 75 of insulative nose 20. In one example, the respective shoulder regions 84 and 108 of insulative nose 20 and of center electrode head 54 serve to position electrode head 54 within counter bore 74 when threaded to center electrode wire 52. In one example, as illustrated, expansion gaps 134 and 136 are respectively disposed between collar 106 of center electrode head 54 and the sidewalls of counter bore 74 of insulative nose 20, and between center electrode wire 52 and the sidewalls of central bore 22 to accommodate expansion of center electrode wire 52 and center electrode head 54 due to differences in the coefficients of thermal expansion between the materials thereof. In some examples, a thermal expansion gap may also be present between shoulder regions 84 and 108.

In one example, as illustrated, when threaded to electrode wire 52, circumferentially extending lower perimeter edge 116 of electrode plate 100 forms a continuous radial spark gap 140 having a gap distance, dgap, with the circumferentially extending edge 36-1 defining the inner diameter, di, of side electrode 36 (e.g., ground electrode). By forming a continuous radial spark gap 140, the entire perimeter edge 116 of electrode plate 110 forms a continuous edge which provides a spark point diversity so that electrode plate 100 does not wear or erode as quickly as known spark plugs having a single point spark gap or a plurality of discrete spark gaps, thereby extending the operational life of spark plug 10, in accordance with the present disclosure. In other examples, which are not explicitly illustrated herein, side electrode 36 may include multiple points, with each point forming a separate gap with electrode plate 100.

In one example, the diameter, dh, of center electrode head 54 is greater than the outer diameter, dn, of insulative nose 20, but less than the inner diameter, di, of side electrode 36 such that spark gap 140 is diagonal and at an acute angle, a, relative to central axis 14 such that spark gap 140 is not "shaded" by electrode plate 100 when spark plug 10 is disposed within a combustion chamber of an internal combustion engine. In examples, the gap distance, dgap, of spark gap 140 may be varied by adjusting various structural features, such as by varying the axial length, ln, of insulative nose 20, by varying the diameter, dh, of center electrode head 54, by varying the inner diameter, di, of side electrode 36, by varying the head angle, θ, of the circumferential edge 114 of disk-shaped electrode plate 100, and/or by varying the thickness, th, of electrode plate 100, or any combination thereof. In one example, gap distance, dgap, may exceed 2.0 mm. In other examples, electrode head 54 may be disposed relative to side electrode 36 such that a horizontal surface gap is formed between electrode plate 100 and side electrode 36 (a so-called "surface gap" spark plug).

Spark plugs are configured to operate within an industry-standard heat range, which is typically defined as being between 600° C. and 850° C. A spark plug operating at temperatures above such heat range may cause pre-ignition of the air-fuel mixture within the cylinder. If operating below such temperature range, the air-fuel mixture may not burn properly so that residue may build-up on the spark plug ("fouling") and lead to failed or inconsistent spark generation ("misfiring"). As such, for optimal operation, a spark plug should operate with an electrode head temperature hot enough to provide self-cleaning (i.e., to bum off residue), but cool enough to avoid pre-ignition of the air-fuel mixture.

A tremendous amount of heat is generated within a cylinder during engine operation, a portion of which is absorbed by, and must be dissipated by, the spark plug. Since different engines generate and dissipate different amounts of heat and are designed with different optimal operating temperatures or heat ranges, each engine typically specifies a temperature range, or heat range, at which a spark plug must operate in order to provide optimal engine performance. With this in mind, spark plugs are typically designated with a heat rating, where such heat rating is indicative of the ability of the spark plug to dissipate heat and, thus, indicative of a temperature (or range of temperatures) at which the spark plug is configured to operate. A so-called "hot" plug has a configuration which is slower to draw heat away from the electrode head and, thus, has a higher operating temperature within the standard heat range, while a so-called "cold" plug has a has a configuration which draws heat away from the electrode head more quickly and, thus, has a lower operating temperature within the standard heat range. As such, to better ensure optimal performance, engines typically specify a heat rating, or heat ratings, of spark plugs to be used therewith. Employing spark plugs which do not comply with a specified heat range may result in sub-optimal engine performance and even engine failure.

Spark plugs typically dissipate absorbed heat by passing heat from the electrode head through the center electrode wire to the insulative core, and from the insulative core to the engine cooling system via the threaded metal shell (which is threaded into the cylinder head). Generally, the heat range of a spark plug is related to a length of the tapered insulating nose of the ceramic insulating core. The longer the insulating nose, the less the amount of surface area of the ceramic insulating core which will be in direct contact with the metal shell for transfer of heat to the engine cooling system, and the "hotter" the operating temperature of the spark plug. Conversely, the shorter the insulating nose, the greater the amount of surface area of the ceramic insulating core which will be in direct contact with the metal shell for transfer of heat to the engine cooling system, and the "cooler" the operating temperature of the spark plug.

In known spark plugs, including platinum and iridium spark plugs, the center electrode head does not exceed the diameter of the center electrode wire (i.e., does not exceed the diameter of the central bore at its narrowest point). Due to the small exposed surface area of the electrode head (the smaller the exposed surface area, the less the amount of heat absorbed by the electrode head). Because of the relatively large thermal pathway provided from the electrode head to the ceramic insulator by the electrode wire of known spark plugs (where the diameter of the center electrode head does not exceed the diameter of the center electrode wire), overheating of known spark plugs is generally not an issue.

To conform to industry-standard heat range specifications and to achieve an extended life expectancy, spark plug 10, in accordance with the present disclosure, dissipates a large amount of heat from the large electrode plate 100 of center electrode head 54 as compared to known plugs. For example, electrode plate 100 may be 8 mm in diameter as compared to 1.1 mm of the platinum disk of a conventional platinum spark plug. As illustrated and described above, to enable a large amount of heat dissipation from electrode head 54, example spark plug 10 of the present disclosure includes a number of unique structural features to create a large thermally conductive pathway between electrode head 54 and metal shell 30. In examples, the ability of electrode head 54 to quickly dissipate large amounts of heat enables spark plug 10 to employ a large electrode plate 100 of traditional copper and nickel-alloy materials (i.e., non-rare earth or precious metals) while providing a comparable life expectancy and improved engine performance (e.g., faster combustion, improved torque) relative to known platinum and iridium spark plugs.

A first example of a unique structural feature is that an amount of surface area of electrode plate 100 exposed to the combustion chamber via which heat may be absorbed is limited by mounting electrode plate 100 with a portion of bottom surface 110 flush with end surface 75 of insulative nose 20. In addition to reducing the amount of exposed surface area and, thus, the amount of heat transfer to electrode plate 100, direct contact between bottom surface 110 and end surface 75 further provides a thermal pathway for transferring heat from electrode plate 100 to insulative core 12.

Another unique structural feature is the threaded connection between center electrode head 54 and center electrode wire 52 via threaded collar 106. The large circumferential surface area contact between threaded collar 106 and electrode wire 52 provides a large heat transfer pathway from electrode plate 100 to center electrode wire 52 and subsequently to the engine cooling system via metal shell 30. The threaded connection enables the same or similar materials to be employed by center electrode head 54 and center electrode wire 52, thereby providing a contiguous heat transfer pathway of materials having the same or similar thermal characteristics (e.g., thermal conductivity and coefficient of thermal expansion). Using materials having the same or similar thermal characteristics also reduces the potential for physical failure of the connection between center electrode head 54 and center electrode wire 52 that might otherwise result between materials having different thermal expansion characteristics.

A further unique structural feature is the seating of collar 106 within counter bore 74 of insulative nose 20. Seating collar 106 within counter bore 74 provides a large amount of surface contact area between center electrode head 54 and insulative nose 20 which forms a large heat transfer pathway from center electrode head 54 to insulative core 12.

The above-described unique structural features, which together thermally couple electrode head 54 to electrode wire 52 and insulative core 12, provide an amount of heat transfer from center electrode head 54 which enables center electrode head 54 to be formed using traditional copper and nickel-alloy materials. Such traditional materials have thermal conductivities superior to those of harder, more heat resistant materials (e.g., iridium, platinum, and other non-traditional materials) and, thus, further improves the heat dissipation capacity of spark plug 10.

Figure 8A:
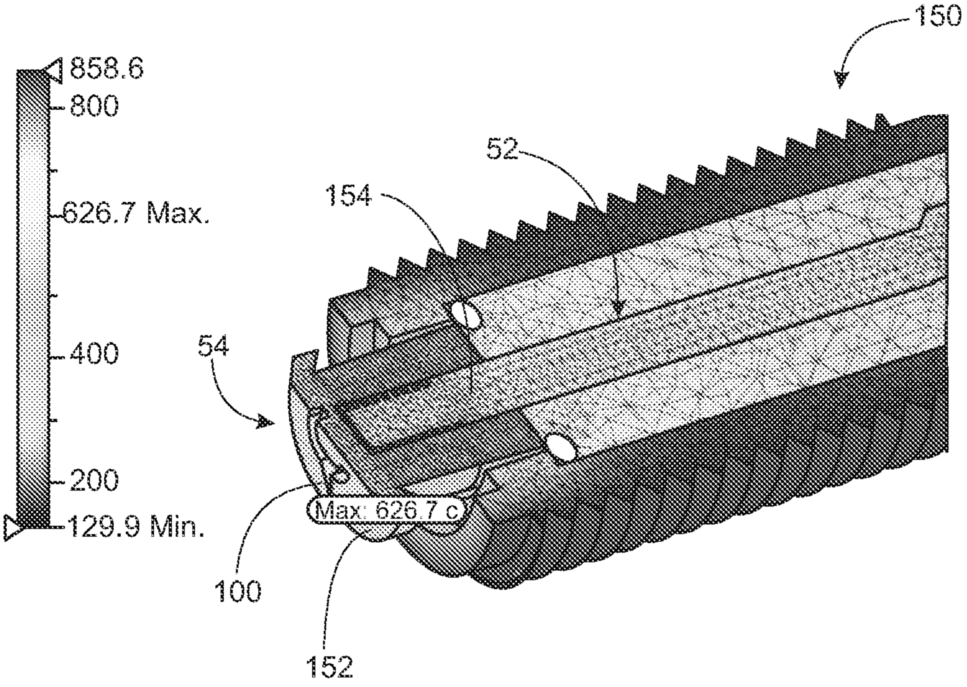
FIG. 8A is a diagram illustrating a simulated operating temperature of a spark plug, in accordance with one example of the present disclosure.
Figure 8B:
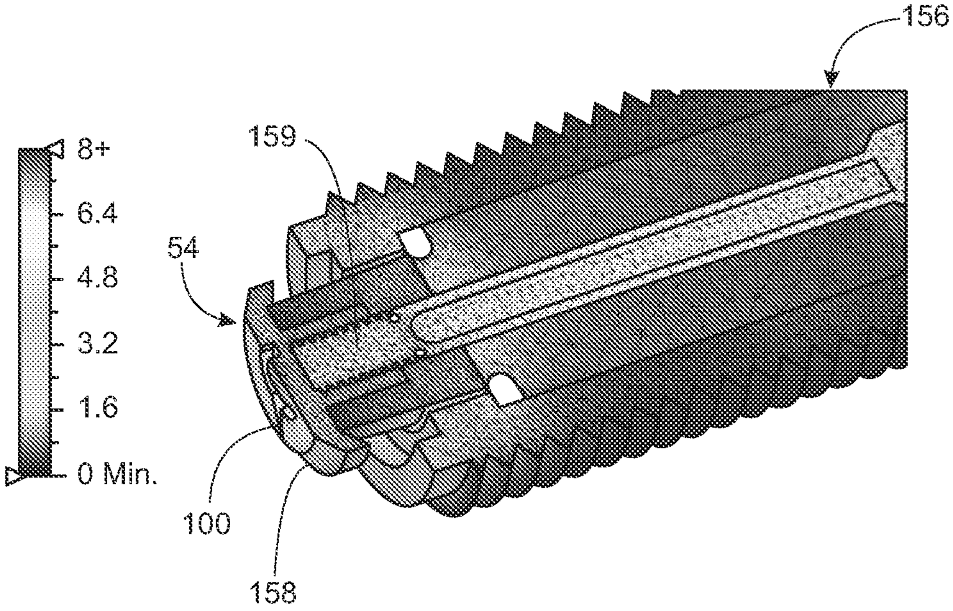
FIG. 8B is a diagram illustrating a simulated operating heat flux of a spark plug, in accordance with one example of the present disclosure.
Figure 9A:
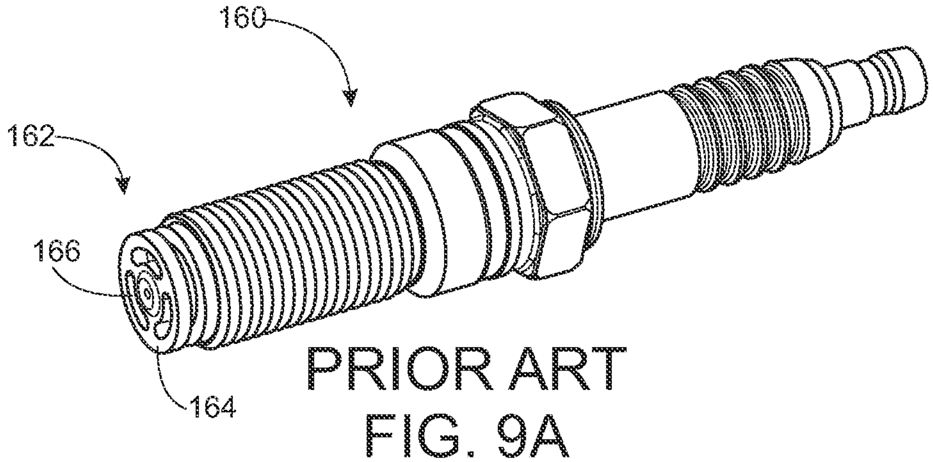
PRIOR ART FIG. 9A
FIG. 9A is a perspective view of a known spark plug, according to one example.
Figure 9B:
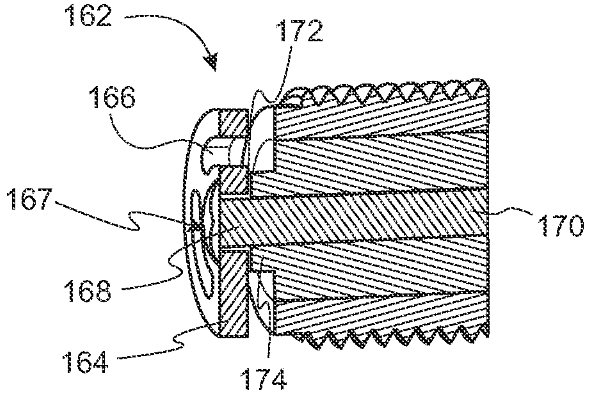
PRIOR ART FIG. 9B
FIG. 9B is a cross-sectional view of a firing end of a known spark plug, according to one example.
Figure 9C:
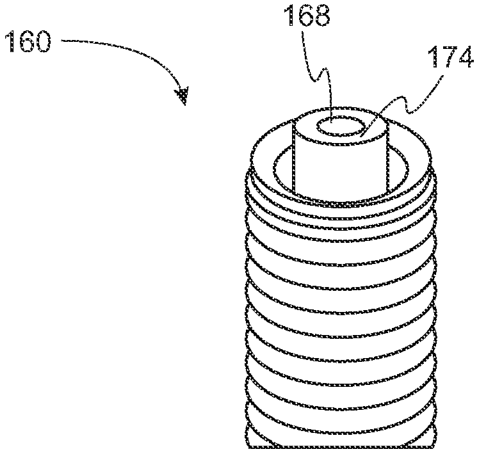
PRIOR ART FIG. 9C
FIG. 9C is a photograph of a firing end of a known spark plug, according to one example.

FIGS. 8A through 10B below illustrate and describe durability testing simulations for an example spark plug similar to that illustrated above by spark plug 10, in comparison to that of a known spark plug 160 (as illustrated by FIGS. 9A-9C). FIGS. 8A and 8B respectively illustrate the simulated operating temperature and heat flux for example spark plug 10, while FIGS. 10A and 10B respectively illustrate the simulated operating temperature and heat flux for known spark plug 160. It is noted that the durability testing simulation was performed using Autodesk® Fusion 360.

The durability testing simulations for spark plugs 10 and 160 each used the same designated thermal model setup conditions, which included both operating conditions and boundary conditions. The operating conditions were modeled a power output of 210 HP at 5,000 rpm (high power, but not extreme conditions). The boundary conditions were modeled with the electrode and plug face at a 1050° C. gas temperature and htc=750 $W/m^2K$ (from 1D model); the threat and seat fixed at 130° C. (assumed to be anchored to the engine head temperature; a plug back side (ambient) at a 60; and contact resistances were estimated from wire-to-insulator, insulator-to-housing, and disk-to-insulator.

FIG. 8A is a cross-sectional view illustrating a mapping 150 of operating temperatures of spark plug 10 according to the above-described durability testing simulation. According to the simulation, spark plug 10 has a maximum simulated operating temperature of 627° C. occurring at electrode plate 100 of electrode head 54, as indicated at 152. A simulated operating temperature of center electrode wire 52 occurring at 154 is approximately 550° C. FIG. 8B is cross-sectional view illustrating a mapping 156 of the heat flux of spark plug 10, according to the above-described durability testing simulation where at electrode plate 100 the simulated heat flux is approximately 3.0 $W/mm^2$, as indicated at 158, and where center electrode wire 52 is joined with electrode head 54 the simulated heat flux is approximately 4.2 $W/mm^2$, as indicated at 159.

It is noted that a maximum operating temperature of spark plug 10 may be adjusted by increasing or decreasing the length, ln, of insulative nose 20 (e.g., see FIGS. 2A and 2B) and/or by adjusting the dimensions of electrode plate 100 to increase/decrease an amount of surface area exposed to the combustion chamber which increases/decreases the rate of heat transfer to electrode plate 100 from the heat of combustion. In one example, as described above, electrode plate 100 has a minimum diameter, dh, that is greater than the outer diameter, dn, of insulative nose 20 so that the lower circumferential edge 116 of electrode plate 100 extends from insulative nose 20 to form spark gap 140 with side electrode 36. In one example, for a given arrangement (e.g., a given thickness, th, of disk-shaped electrode plate 100, a given length, ln, of insulative nose 20, etc.), electrode plate 100 has a maximum diameter, dh, that provides a surface area exposed to the combustion chamber which results in electrode plate 100 having a maximum operating temperature up to the industry standard maximum spark plug temperature (e.g., 850° C.) above which pre-ignition may occur.

As mentioned above, in contrast to the example spark plug 10 of the present disclosure, due to thermal issues (failure to dissipate heat), known spark plugs employing large center electrode heads (e.g., larger than the diameter of the central electrode wire) have physically failed during operation and/or have failed to achieve operating lifetimes approaching that of platinum and iridium spark plugs. Such thermal issues are attributable to multiple structural deficiencies.

FIGS. 9A-9C illustrate an example of a known spark plug 160 employing a large center electrode head 162 having an electrode plate 164 with a number of openings or perforations 166 extending there through. A first structural deficiency of known spark plug 160 is that electrode head 162 of has a large amount of surface area which is exposed to the heat of combustion within the combustion chamber, resulting in a high heat transfer rate to the electrode heads. A second structural deficiency results from electrode plate 166 being welded to a tip 168 of center electrode wire 170 whereby a heat transfer path from the electrode plate 164 to the center electrode wire 170 is formed only through a weld bead 169 and tip 168, which creates a thermal bottleneck that concentrates head at tip 168 and limits heat transfer from electrode head 162. A third structural deficiency is that the electrode plate 164 and the weld material be formed of high-temperature nickel alloys (i.e., non-traditional copper nickel-alloy materials, such as "Alloy-X") which are not as thermally and electrically conductive as traditional copper and nickel-alloy materials. Use of high-temperature nickel-alloys also means that the large electrode plate 164, weld bead 169, and center electrode wire 170 are formed of different materials having different thermal characteristics (e.g., different coefficients of thermal expansion) which can lead to physical failure.

Additionally, in some examples, the large electrode heads of known spark plugs are spaced from the insulator nose, such as illustrated by a gap 172 between electrode plate 164 and an insulator nose 174. Gap 172 results in an increased surface area of electrode plate 164 being exposed to the combustion chamber as well as a surface area of a portion of an end of the center electrode wire 170 (which is completely shielded from the combustion chamber by the structure of spark plug 10 of the present disclosure). Such exposure increases the rate of heat transfer to the electrode head and, in one example, is known to have caused physical failure of the exposed portion of the electrode wire 70 at the point of connection with electrode plate 164, resulting in the catastrophic detachment of electrode plate 164 form center electrode wire 170, as illustrated by the photograph of FIG. 9C.

Figure 10A:
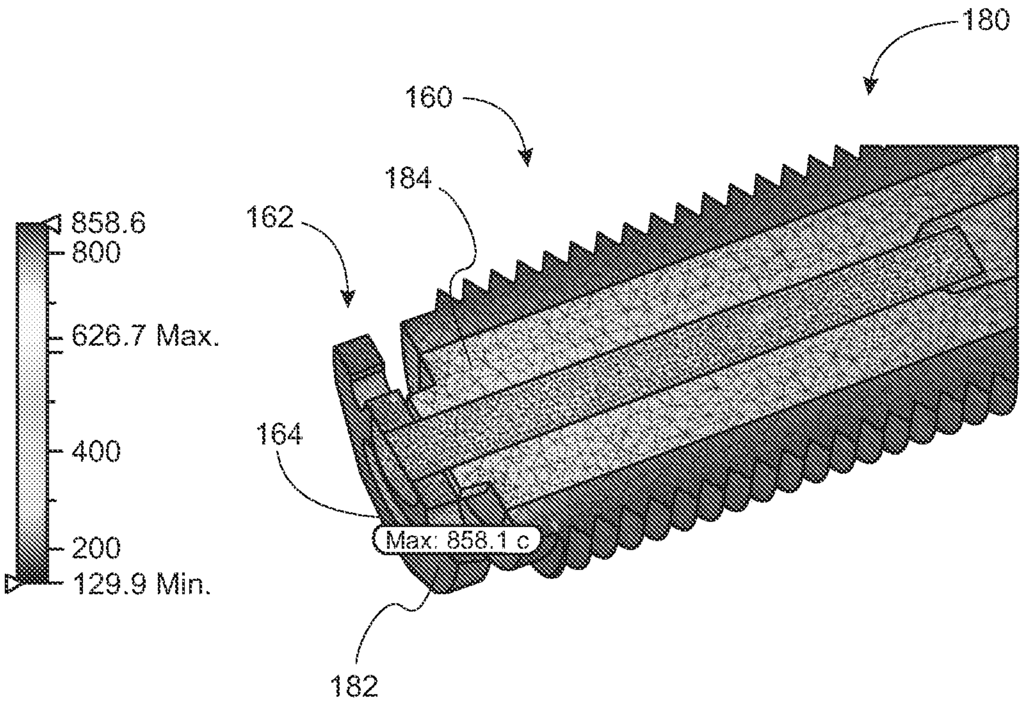
FIG. 10A is a diagram illustrating a simulated operating temperature of a known spark plug, according to one example
Figure 10B:
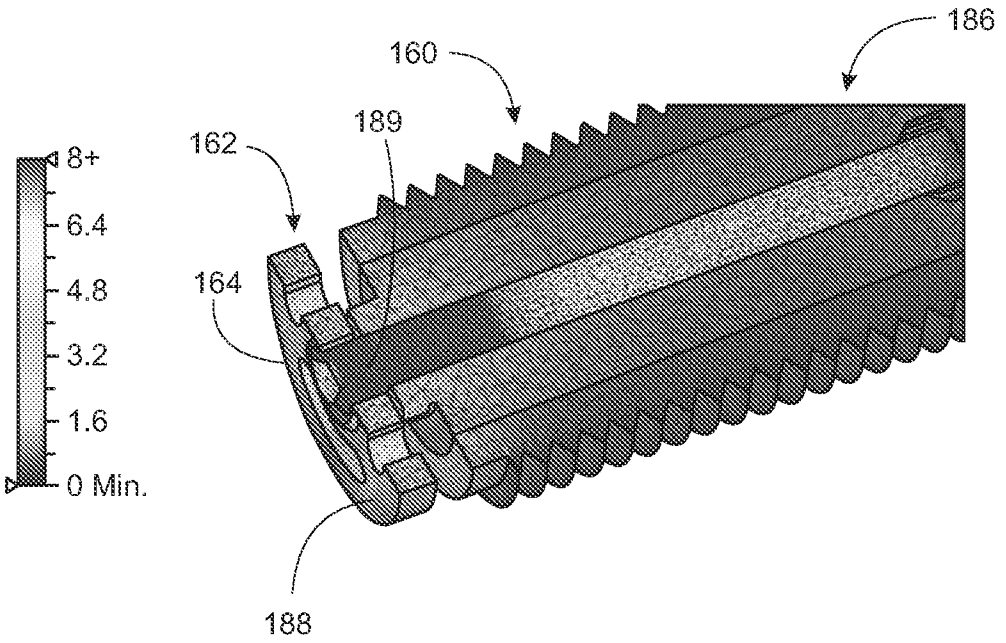
FIG. 10B is a diagram illustrating a simulated operating heat flux of a known spark plug, according to one example.

FIG. 10A is a cross-sectional view illustrating a mapping 180 of operating temperatures of known spark plug 160 according to the above-described durability testing simulation. According to the simulation, known spark plug 160 has a maximum simulated operating temperature of 858° C. occurring at electrode plate 164 of electrode head 162, as indicated at 182. A simulated operating temperature of center electrode wire 170 occurring at 184 is approximately 760° C. FIG. 8B is cross-sectional view illustrating a mapping 186 of the heat flux of spark plug 10, according to the above-described durability testing simulation where at electrode plate 100 the simulated heat flux is approximately 1.4 $W/mm^2$, as indicated at 188, and where center electrode wire 170 is joined with electrode plate 164 the simulated heat flux is approximately 8.0 $W/mm^2$, as indicated at 189.

FIGS. 11A-17C illustrate a spark plug 210, according to another example of the present disclosure. As will be described in greater detail below, in contrast to spark plug illustrated above, rather than being threaded to one another, center electrode wire 252 is attached to center electrode head 254 via a brazing and stamping process (also referred to as "staking", e.g.; see FIGS. 18A-18D).

Figure 11B:
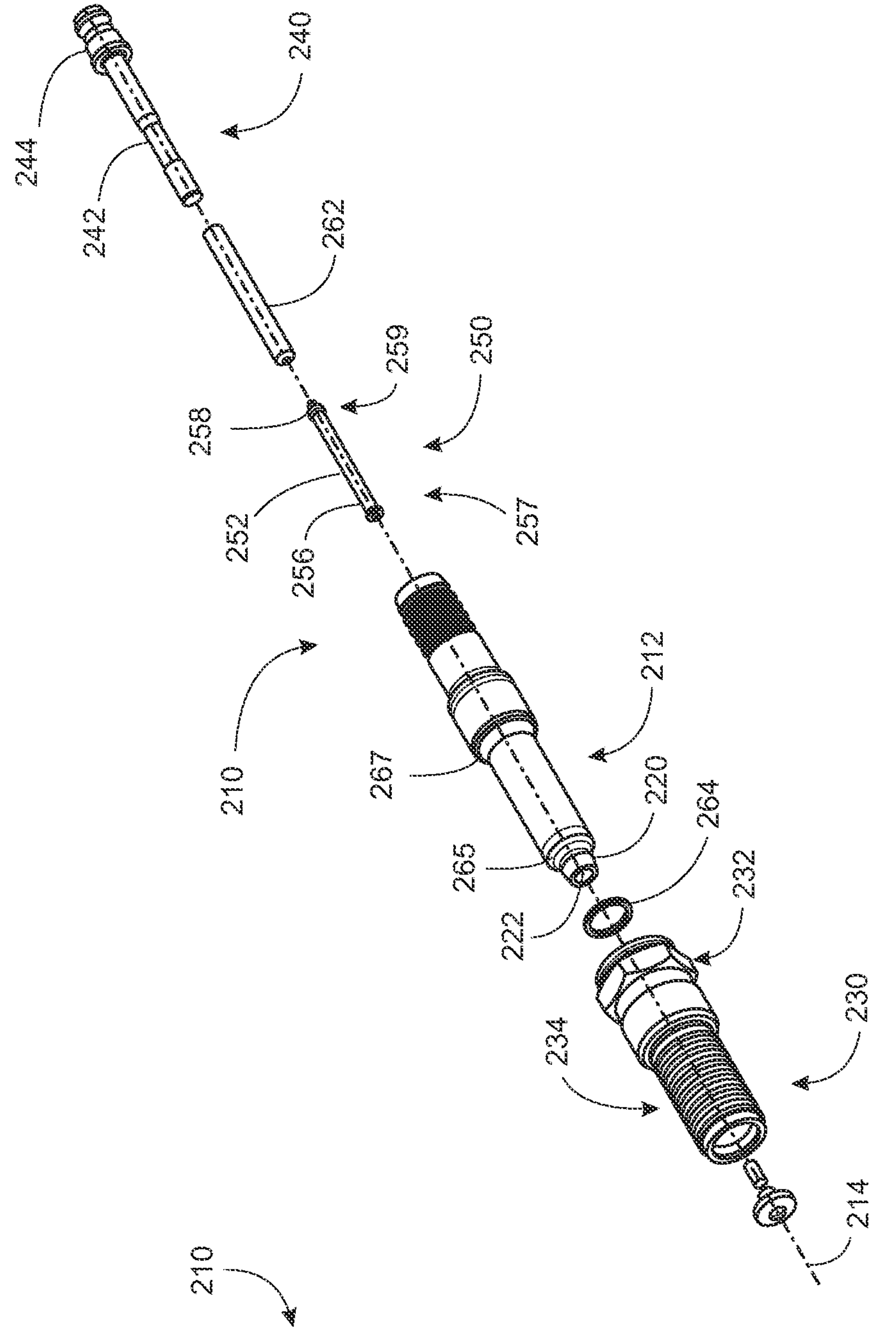
FIG. 11B is an exploded view of a spark plug, in accordance with one example.
Figure 11A:
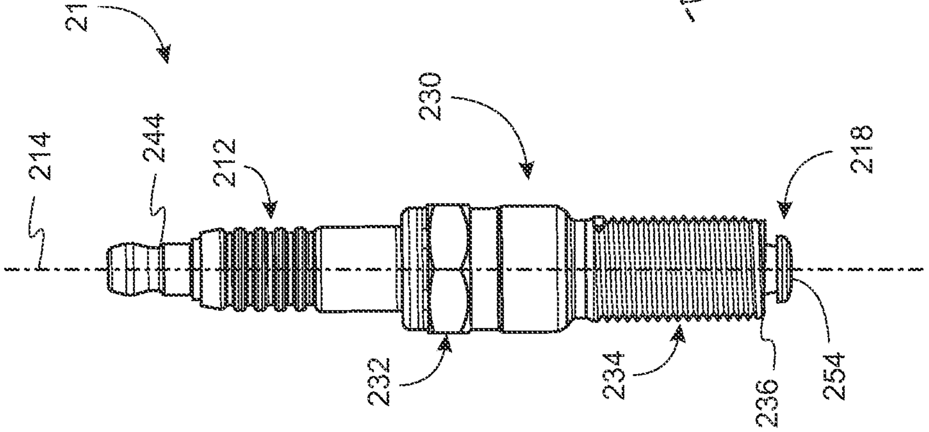
FIG. 11A is a side view of a spark plug, in accordance with one example.

FIGS. 11A and 11B are renderings respectively illustrating side and exploded views of an example spark plug 210, in accordance with the present disclosure. Spark plug 210 includes a generally cylindrical insulative core 212 extending along an axial centerline 214 from a terminal end 216 to a firing end 218, the insulative core 212 including an insulative nose 220 at firing end 218 and a central bore 222 extending axially there through. A metal shell 230 concentrically encases a portion of cylindrical insulative core 212. In one example, the metal shell 230 includes a nut 232 (e.g., a hex nut) and a tube-like threaded sleeve 234. Metal shell 230 serves as a threaded bolt to be threaded into a cylinder head of an engine when spark plug 210 is installed therein. In one example, metal shell 230 defines a side electrode 236 proximate to firing end 218, with metal shell 230 forming an electrically conductive path from side electrode 236 to the cylinder head when spark plug 210 is installed therein. In one example, as illustrated, side electrode 236 is a circumferentially extending perimeter electrode. It is noted that, in most applications, side electrode 236 serves as a ground electrode.

Spark plug 210 further includes a terminal electrode 240 and a center electrode 250 extending axially along axial centerline 214. Terminal electrode 240 includes a terminal wire 242 extending to a terminal stud 244 proximate to terminal end 216. In accordance with the example implementation of FIGS. 11A-17C, center electrode 250 includes a center electrode wire 252 attached to a center electrode head 254, where center electrode head 254 is attached to center electrode wire 252 via at least a brazed connection (e.g., see FIGS. 18A-18D below). In one example, as will be described in greater detail below, in addition to a brazed connection, center electrode wire 252 is further secured to electrode head 254 by "staking" or "stamping" process where first end 257 is compressed to form a cap 256 which is seated within a pocket 303 in center electrode head 254 (e.g., see FIG. 14B).

Figure 12A:
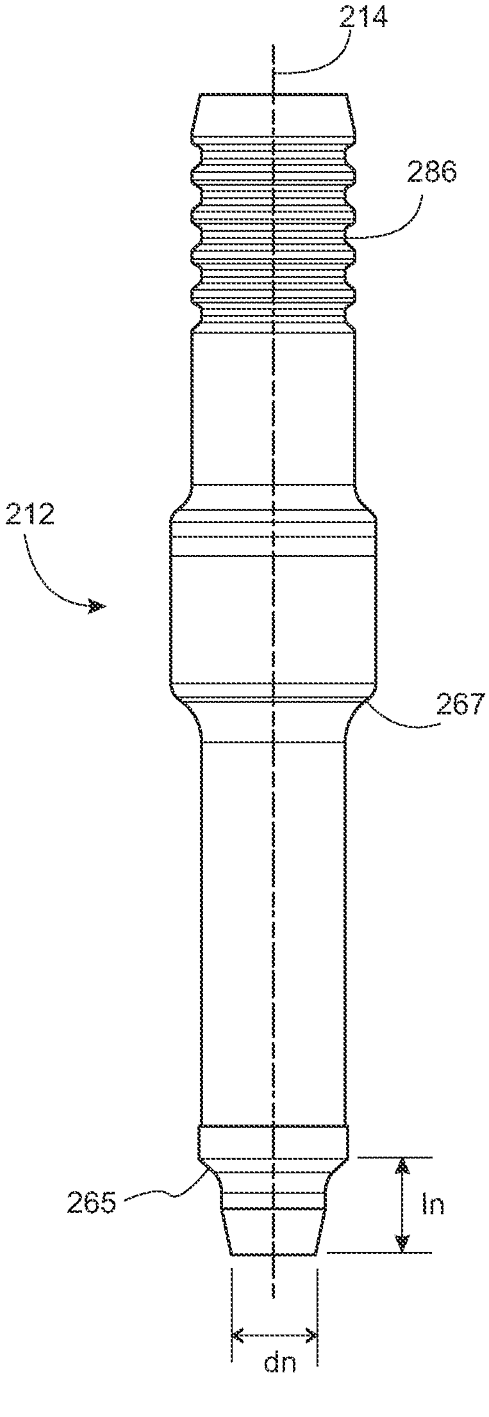
FIG. 12A is a side view of an insulative core, in accordance with one example.
Figure 12B:
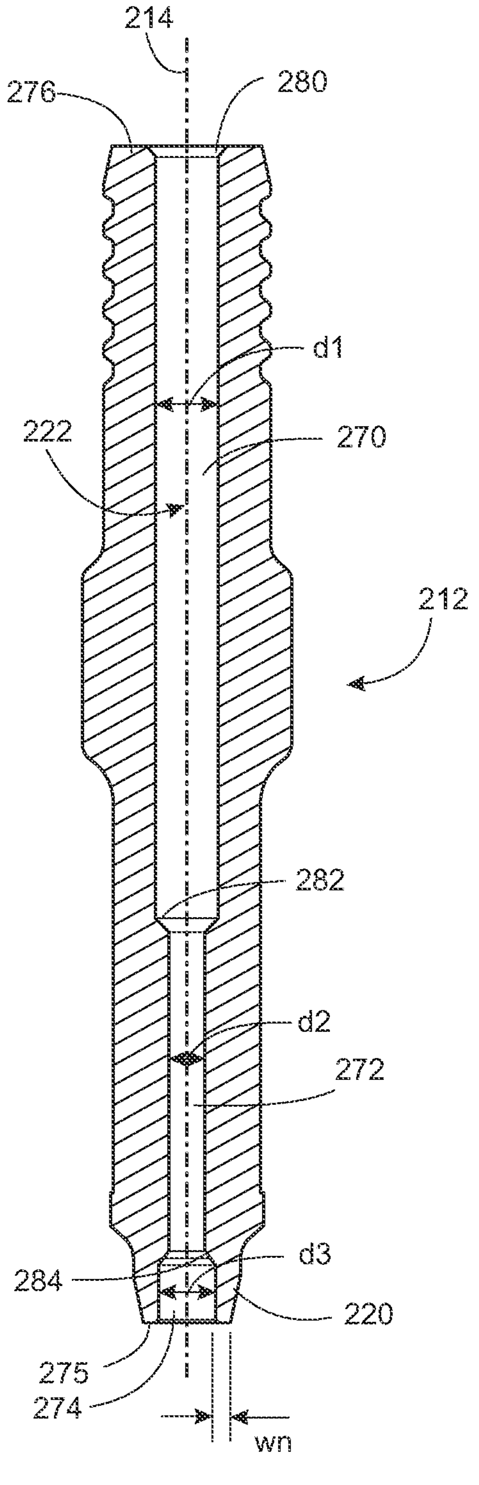
FIG. 12B is a cross-sectional view of an insulative core, in accordance with one example.
Figure 17A:
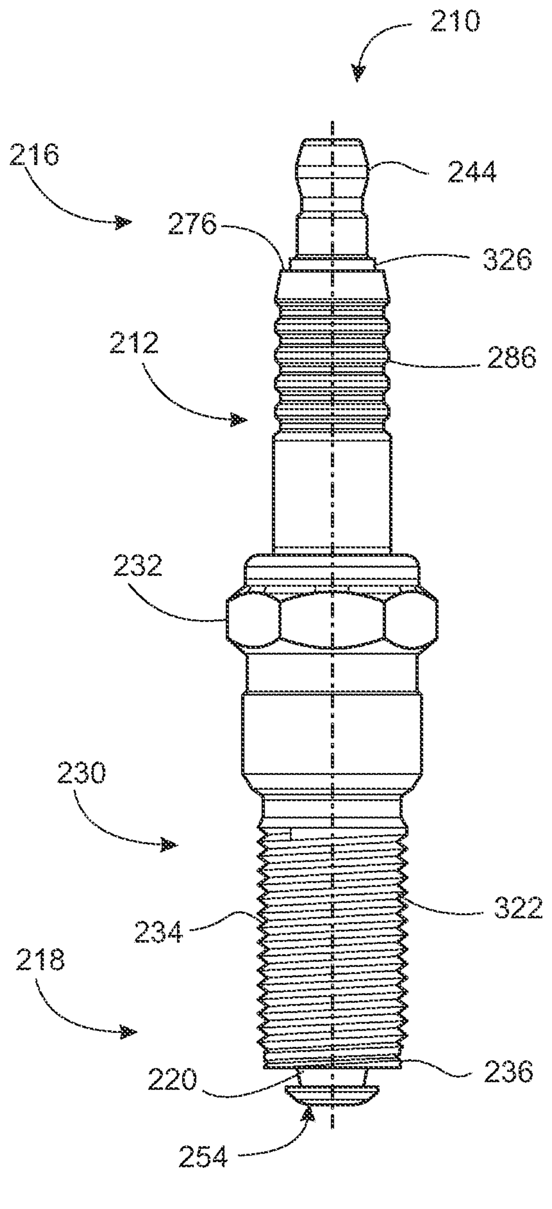
FIG. 17A is a side view of a spark plug, in accordance with one example.
Figure 17B:
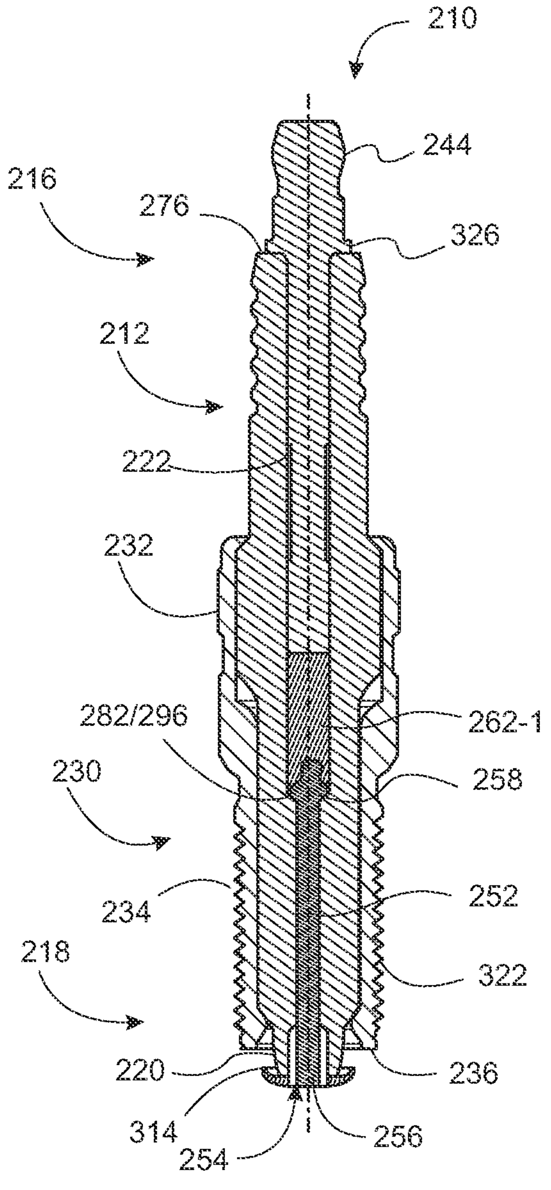
FIG. 17B is a cross-sectional view of a spark plug, in accordance with one example.

With continued reference to FIGS. 11A and 11B, according to one example, center electrode wire 252 inserts into central bore 222 of insulative core 212 via terminal end 216 until wire head 258 at second end 259 engages a tapered shoulder 282 within central bore 222 (e.g., see FIGS. 12B and 17B). Insulative core 212 inserts into threaded sleeve 234, with a gasket 264 forming a seal between an interior surface of threaded sleeve 234 and a shoulder 265 of insulative core 212 (e.g., see FIG. 17B). In one example, after being inserted within threaded sleeve 234, insulative nose 220 of insulative core 212 extends axially beyond side electrode 236, and first end 257 of center electrode wire 252 extends axially beyond insulative nose 220 so as to be exposed therefrom. In one example, which will be described in greater detail below (see FIGS. 18A-18D), after center electrode wire 252 and insulative core 212 have been inserted within threaded sleeve 234, central electrode head 254 is connected to central electrode wire 252.

With center electrode wire 252 disposed within central bore 222, a conductive glass powder 262 is disposed within central bore 22 from terminal end 216, followed by insertion of terminal wire 242 of terminal electrode 240 into central bore 222, with terminal wire 242 being employed to tamp glass powder 262. Glass powder 262 is then fired at high-temperatures so as to be melted. Upon cooling, the melted glass powder 262 solidifies to form a solid glass lock 262-1 (see FIG. 17B) which locks terminal electrode 240 and center electrode 250 in place within insulative core 212, and which serves as an electrically conductive path between terminal electrode 240 and center electrode 250. In examples, solid glass lock 262-1 provides a resistance which dampens transmission of radio frequency interference.

Similar to that described above with respect to spark plug 10, by attaching center electrode head 254 to center electrode wire 252 after center electrode wire 252 is disposed within central bore 222 of insulative core 212, center electrode head 254 of spark plug 210 can be sized larger than the diameter of central bore 222. It is noted that techniques other than those described herein may be employed to assemble spark plug 210. For example, in other cases, center electrode head 254 may be attached to center electrode wire 252 before center electrode wire 252 is inserted within central bore 222.

As will be described in greater detail below, a large center electrode head provides an increased linear edge length (e.g., a continuous circumferential edge) which increases the spark point diversity of the center electrode head when forming a spark gap with a corresponding side electrode extending from the metal shell. In-turn, the increased spark point diversity enables a spark plug, in accordance with the present disclosure, to utilize an enlarged center electrode head formed with nickel-alloys traditionally employed for nickel spark plug electrodes while providing improved engine performance and achieving lifetimes comparable to iridium spark plugs.

FIGS. 12A and 12B respectively illustrate side and cross-sectional views of insulative core 212, according to one example, and illustrate central bore 222 extending there through. In one example, central bore 222 includes a first portion 270 having a first diameter, d1, and a second portion 272 having a second diameter, d2, which is smaller than first diameter, d1, and a counter bore 274 having a third diameter, d3, which is disposed within insulative nose 220 proximate to firing end 218 in assembled spark plug 210, where third diameter, d3, is greater than second diameter, d2. Central bore 222 further includes a tapered shoulder region 280, at the entrance to central bore 222 proximate to terminal end 216 in assembled spark plug 210, a tapered shoulder region 282 at a transition from the diameter, d1, of the first portion 270 to the smaller diameter, d2, of second portion 272, and a tapered shoulder region 284 at a transition from counter bore 274 to the smaller diameter, d2, of second portion 272. Insulator nose 220 has an axial length, ln, and has an end surface 275 disposed concentrically about counter bore 274. Insulative core 212 further includes a corrugated region 286, proximate to terminal end 216 in assembled spark plug 210, which increases a surface distance between terminal stud 244 of terminal electrode 240 and nut 232 of metal shell 230 (see FIG. 11A) to reduce a potential for electrical arcing there between.

Figure 13A:
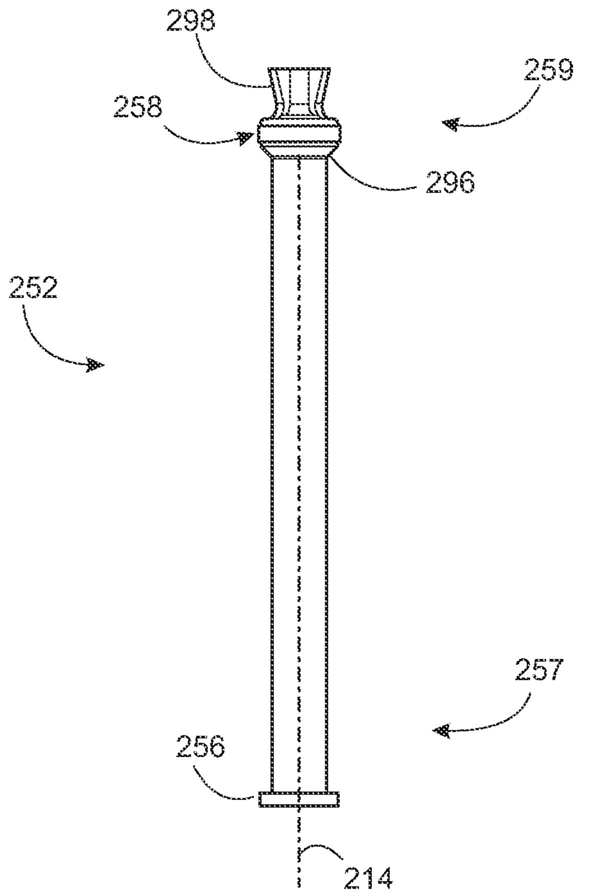
FIG. 13A is a side view of a center electrode wire, in accordance with one example.
Figure 13B:
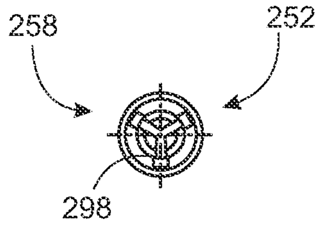
FIG. 13B is a cross-sectional view of a center electrode wire, in accordance with one example.

FIGS. 13A and 13B respectively illustrate top and side and views of center electrode wire 252, according to one example. In one example, center electrode wire 252 is formed using pure copper (e.g., 99.99% copper) and extends between first end 257 and opposing second end 259. In one example, first end 257 includes a cap 256 which, as described above, is formed via a staking process, where cap 256 is to seat within a pocket 303 in electrode head 254 (e.g., see FIG. 14B). In one example, second end 259 includes a shoulder region 296 where wire head 258 transitions to the smaller diameter electrode wire 252, where shoulder region 296 is configured to engage corresponding shoulder region 282 of insulative core 212 when installed within central bore 222 (see FIG. 17B). In one example, wire head 258 includes a plurality of fin-like projections 298 extending longitudinally therefrom which are configured to interlock with and secure center electrode wire 252 within conductive glass powder 262 (which is subsequently melted to form conductive glass lock 262-1, as illustrated by FIG. 17B). In one case, as illustrated, wire head 258 includes a set of three fin-like projections 298 which extend radially at 120-degrees from one another.

Figure 14A:
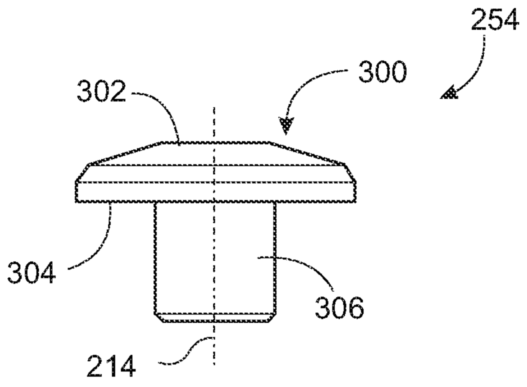
FIG. 14A is a side view of a center electrode head, in accordance with one example.
Figure 14B:
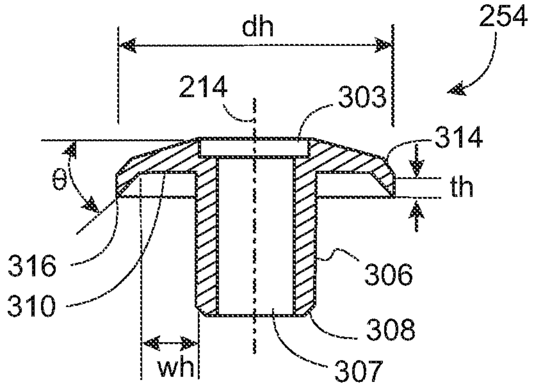
FIG. 14B is a cross-sectional view of a center electrode head, in accordance with one example.
Figure 14C:
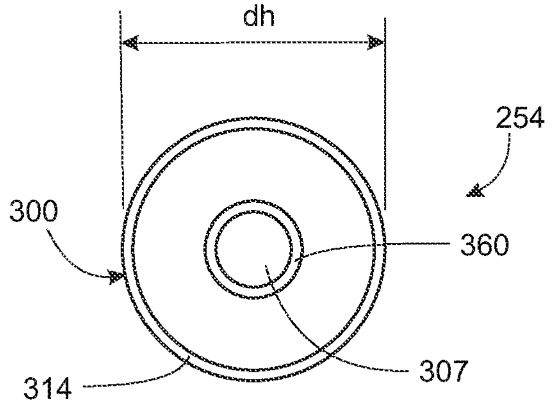
FIG. 14C is a top view of a center electrode head, in accordance with one example.

FIGS. 14A, 14B and 14C respectively illustrate side, cross-sectional, and top views of center electrode head 254, according to one example. In one example, center electrode head 254 includes an electrode plate 300 having an upper surface 302, and opposing lower surface 304, and a collar 306 extending from lower surface 304, with a bore 307 extending longitudinally through center electrode head 254 to receive center electrode wire 252. In one example, as illustrated, electrode plate 300 includes a pocket 303 in upper surface 302 that is coaxial with bore 307, where pocket 303 is to receive cap 256 of center electrode wire 252 formed from compression (stamping) of first end 257 (e.g., see FIGS. 18A-18D). In one example, as illustrated, electrode plate 300 is disk-shaped. However, it is noted that electrode plate 300 is not limited to any particular shape nor is electrode plate 300 limited to a single plane. In examples, electrode plate 300 may be flat, convex, concave, circular, non-circular, or any suitable shape for a given implementation of spark plug 210.

Figure 17C:
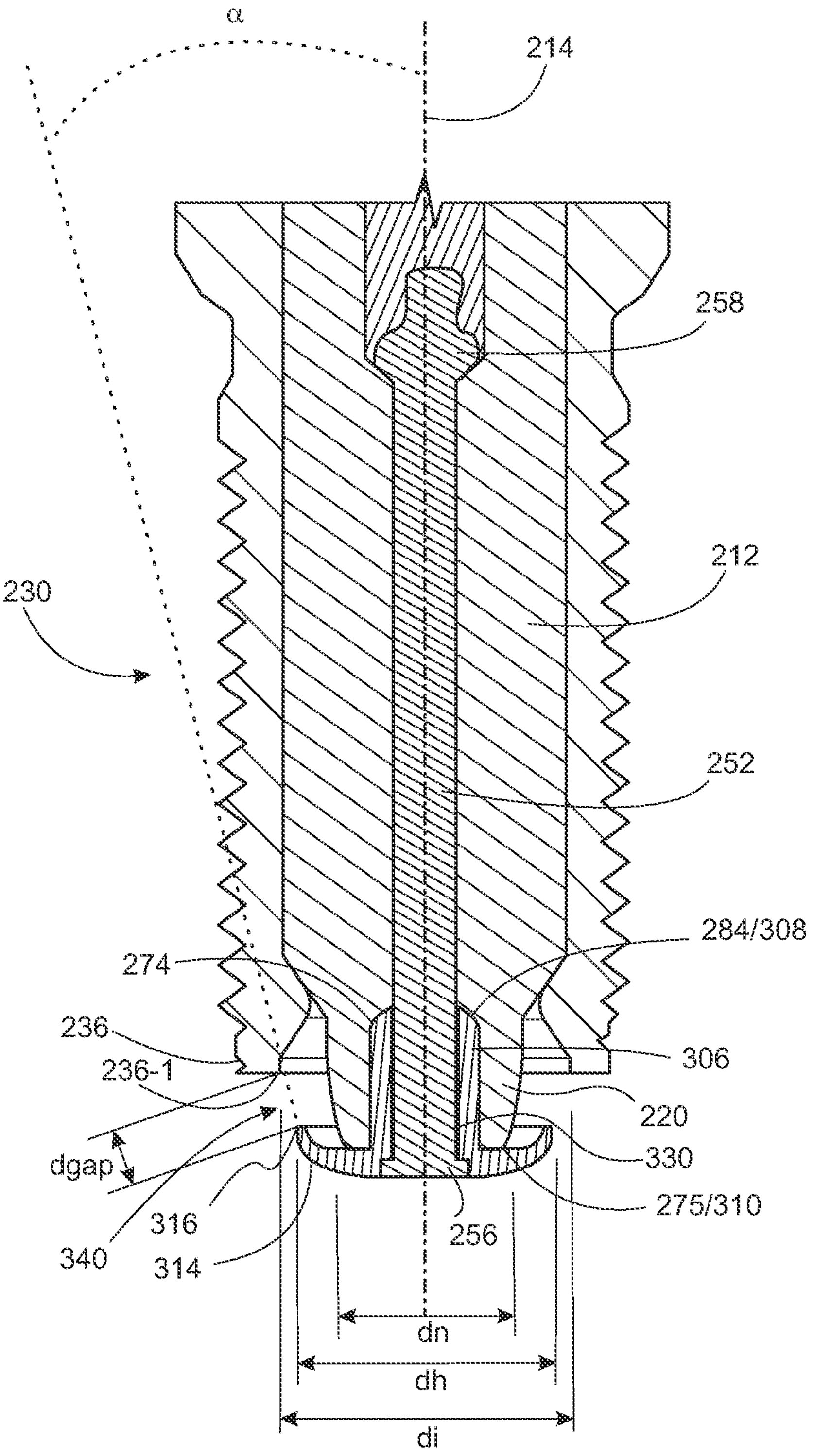
FIG. 17C is an enlarged cross-sectional view of a firing end of a spark plug, according to one example.

When attached to center electrode wire 252, collar 306 is seated within counter bore 274 at insulative nose 220 of insulative core 212 such that a portion 310 of bottom surface 304 of electrode plate 300 surrounding collar 306 engages and is flush with end surface 275 of insulative nose 220 (e.g., see FIG. 17C). As used herein, the term "flush" means to be in direct contact with one another within a range of thermal expansion tolerances. In one example, a width, $w_h$, of ring-like portion 310 of bottom surface 304 is the same as the width, $w_n$, of the ring-like end surface 275 of insulated nose 220 (e.g., see FIG. 12B). In one example, end surface 275 of insulative nose 220 is planar. In other examples, end surface 275 is non-planar. In examples, end surface 275 has a shape which is a negative of the shape of portion 310 of bottom surface 304 of electrode plate 300 so that portion 310 of electrode plate 300 is seated flush with end surface 275 of insulative nose 220.

In one example, as illustrated, electrode plate 300 is angled downward toward circumferential edge 314 at a head angle, θ, from upper surface 302 toward lower surface 304 such that a spark gap distance, dgap, of a spark gap 340 formed between a circumferential edge 316 of lower surface 304 of electrode plate 300 and circumferentially extending side electrode 236 may vary depending on head angle, θ (see FIGS. 7B and 7C, for example). In one example, electrode plate 300 may be angled in a rounded or disk-like fashion. In other examples, electrode plate 300 may angled in a stepped fashion, such as via a number of separate angled portions (as illustrated) which together produce head angle, θ. In one example, as illustrated, electrode plate 300 has a thickness, $t_h$, and a diameter, dh, which is greater than the diameter, dn, of insulative nose 220 so that circumferential edge 316 of lower surface 304 of electrode plate 300 extends radially beyond insulative nose 220 to form a spark gap 340 with side electrode 236 (see FIG. 17C). In other examples, diameter, dh, of electrode head 254 may be less than diameter, dn, of insulative nose 220 but greater than the diameter, d2, of central bore 222.

Figure 15A:
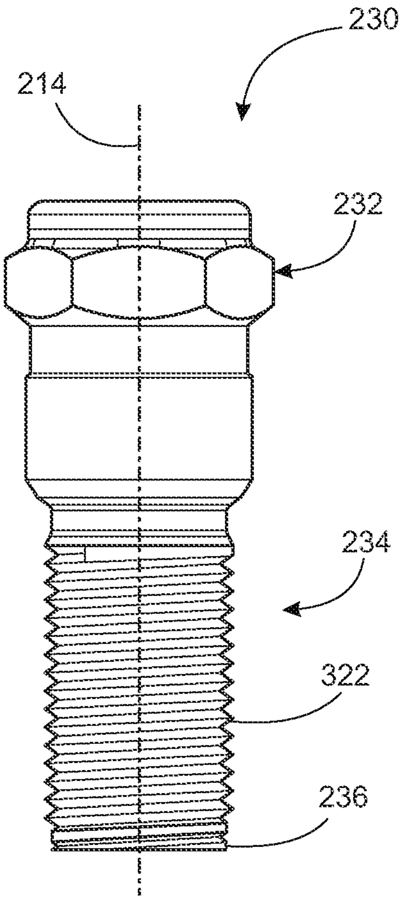
FIG. 15A is a side view of a metal shell, in accordance with one example.
Figure 15B:
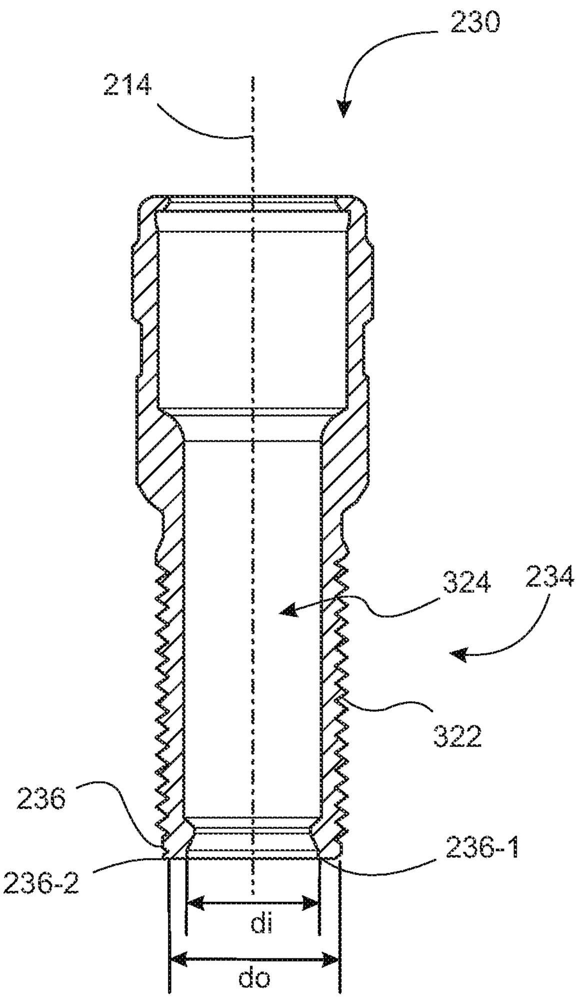
FIG. 15B is a cross-sectional view of a metal shell, in accordance with one example.

FIGS. 15A and 15B respectively illustrate side and cross-sectional views of metal shell 230, according to one example. In one example, metal shell 230 includes threaded sleeve 234 having threads 322 to thread spark plug 210 into an engine cylinder head such that firing end 218 is disposed within a cylinder. In one example, nut 232 includes a hexagonal engagement surface 328, such as for a socket or wrench, to assist in installation of spark plug 210 in an engine cylinder head.

As illustrated, threaded sleeve 234 includes side electrode 236 axially extending from threads 322. In one example, as illustrated, side electrode 322 circumferentially extends from threaded region 322 and is ring-like in shape with an inner diameter, di, formed by an inner perimeter edge 236-1 and an outer diameter, do formed by an outer perimeter edge 236-2. As will be described in greater detail below (see FIG. 17C), in one example, a perimeter edge of side electrode 236 forms a spark gap 340 with a perimeter edge of center electrode plate 300, such as circumferential edge 316 of center electrode plate 300 (see FIG. 14B). While side electrode 236 is illustrated as extending from and being formed as a contiguous part of threaded sleeve 234, in other examples, the term "extending from" encompasses implementations where side electrode 236 is an electrode which is coupled to and axially extends from threaded sleeve 234, such as via welded connection, for example.

Figure 16:
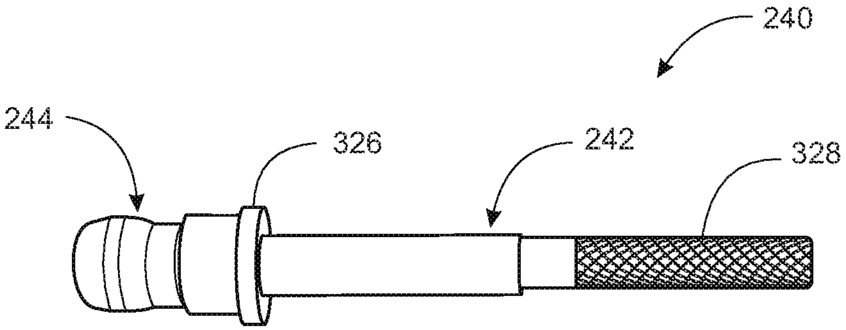
FIG. 16 is a side view of a terminal electrode, in accordance with one example.

FIG. 16 is a side view illustrating terminal electrode 240, according to one example. In one example, terminal electrode 240 includes terminal wire 242 and terminal stud 244, with terminal stud 244 including a flange 326 to engage and be positioned flush with end surface 276 of insulative core 212 (e.g., see FIG. 12B) when terminal electrode 240 is disposed within central bore 222 of spark plug 210 (e.g., see FIG. 17B). In one example, terminal wire 242 includes a knurled region 328 which is configured to interlock with and secure terminal electrode wire 242 within conductive glass powder 262 (which is subsequently melted to form conductive glass lock 262-1, as illustrated by FIG. 17B).

FIGS. 17A and 17B respectively illustrate side and cross-sectional views of spark plug 210, and FIG. 17C illustrates an enlarged cross-sectional view of firing end 218 of spark plug 210, according to one example. As illustrated, insulative nose 220 extends axially beyond side electrode 236 of metal shell 230 at firing end 218, with the first end 257 of center electrode wire 252 being disposed within counter bore 274 of insulative nose 220. In other examples, insulative nose 220 does not extend axially beyond side electrode 236.

In one example, as illustrated, center electrode head 254 is attached to center electrode wire 252 with a braze material 330 disposed between a perimeter surface of center electrode wire 252 and an interior surface of bore 307 of collar 306 such that bottom surface 310 of electrode plate 300 is flush with the end surface 275 of insulative nose 220. In one example, as illustrated in addition to the connection formed by braze material 330, center electrode head 254 is further secured to center electrode wire 252 by a "staking" or "stamping" process where first end 257 of center electrode wire 252 is compressed (stamped) to form cap 256 which is seated within pocket 303 of center electrode head 254. In other examples (not illustrated), electrode head 254 may be connected center electrode wire 252 via a brazed connection (without cap 256). In one example, the respective shoulder regions 284 and 308 of insulative nose 220 and of center electrode head 254 serve to position electrode head 254 within counter bore 274 of insulative nose 220.

In one example, as illustrated, when attached to center electrode wire 252, circumferentially extending lower perimeter edge 316 of electrode plate 300 forms a continuous radial spark gap 340 having a gap distance, dgap, with the circumferentially extending edge 236-1 defining the inner diameter, di, of side electrode 236 (e.g., ground electrode). By forming a continuous radial spark gap 340, the entire perimeter edge 316 of electrode plate 300 forms a continuous edge which provides a spark point diversity so that electrode plate 300 does not wear or erode as quickly as known spark plugs having a single point spark gap or a plurality of discrete spark gaps, thereby extending the operational life of spark plug 210, in accordance with the present disclosure. In other examples, which are not explicitly illustrated herein, side electrode 236 may include multiple points, with each point forming a separate gap with electrode plate 300.

In one example, the diameter, dh, of center electrode head 254 is greater than the outer diameter, dn, of insulative nose 220, but less than the inner diameter, di, of side electrode 236 such that spark gap 340 is diagonal and at an acute angle, a, relative to central axis 214 such that spark gap 340 is not "shaded" by electrode plate 300 when spark plug 210 is disposed within a combustion chamber of an internal combustion engine. In examples, the gap distance, dgap, of spark gap 340 may be varied by adjusting various structural features, such as by varying the axial length, ln, of insulative nose 220, by varying the diameter, dh, of center electrode head 254, by varying the inner diameter, di, of side electrode 236, by varying the head angle, θ, of the circumferential edge 314 of disk-shaped electrode plate 300, and/or by varying the thickness, th, of electrode plate 300, or any combination thereof. In one example, gap distance, dgap, may exceed 2.0 mm. In other examples, electrode head 254 may be disposed relative to side electrode 236 such that a horizontal surface gap is formed between electrode plate 300 and side electrode 236 (a so-called "surface gap" spark plug).

Figure 18A:
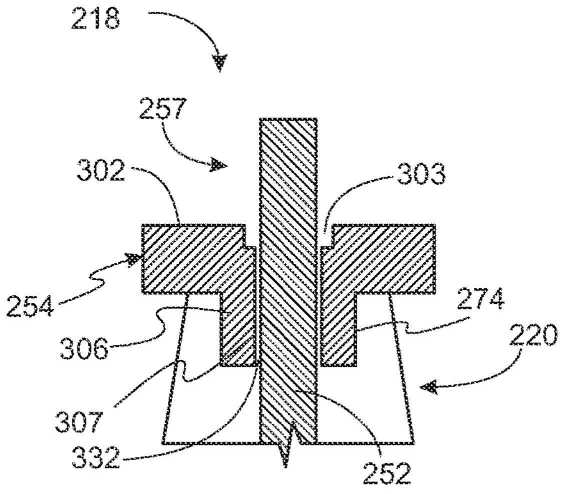
FIGS. 18A-18D are simplified cross-sectional views generally illustrating attachment of center electrode wire to a center electrode head of a spark plug, according to one example of the present disclosure.
Figure 18B:
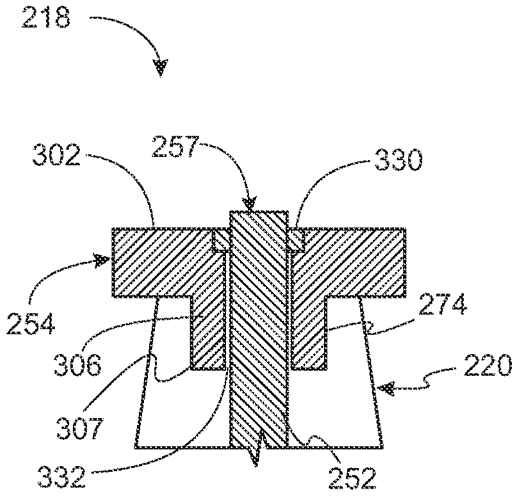

FIGS. 18A-18D are simplified cross-sectional views of firing end 218 of spark plug 210 generally illustrating attachment of center electrode wire 252 to center electrode head 254, according to one example. At FIG. 18A, according to one example, center electrode head 252 is placed on center electrode wire 252 such that collar 306 is seated in counter bore 274 of insulative nose 220 with center electrode wire 252 passing through central bore 222 of insulative core 212 and through bore 307 of center electrode head 254 and first end 257 of center electrode wire 252 extending beyond upper surface 302. In one example, a diameter of bore 307 is greater than a diameter of center electrode wire 252 such that a gap 332 is formed about a circumference of center electrode wire 252 and counter bore 274. Referring to FIG. 18B, according to one example, a portion of first end 257 is removed such that a volume of a remaining portion of center electrode wire 252 extending beyond upper surface 302 of electrode plate 300 matches a volume of pocket 303 disposed circumferentially about center electrode wire 252. Additionally, a brazing material 330 is placed about center electrode wire 252 in pocket 303.

Figure 18C:
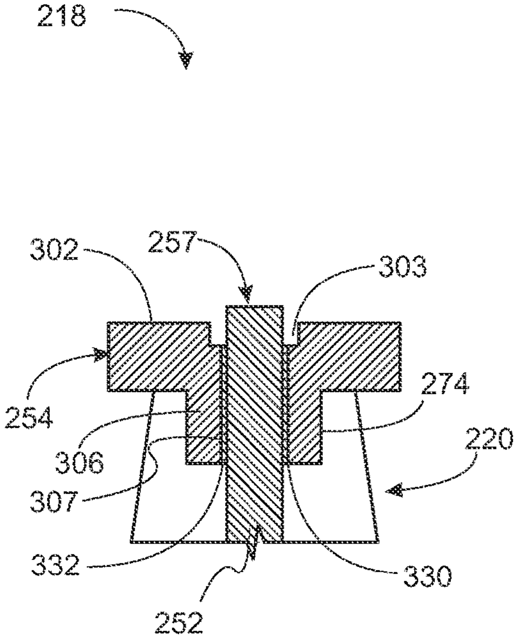
Figure 18D:
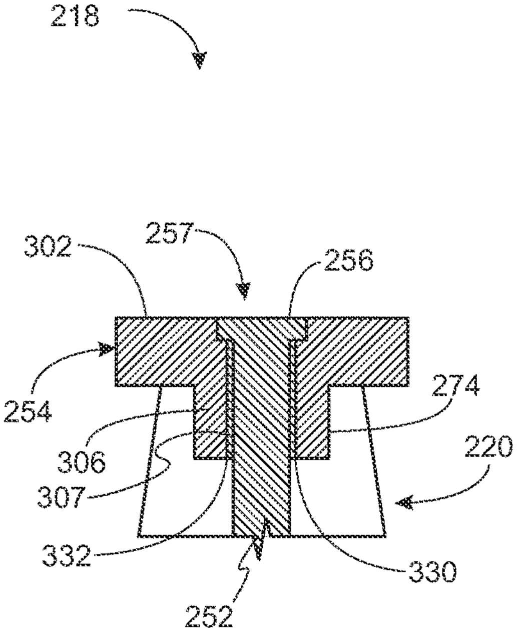

At FIG. 18C, in one example, firing end 218 of spark plug 210 is heated above a melting point of brazing material 330 such that brazing material 330 melts and is drawn into and fills gap 332 via capillary action to form a brazed connection between center electrode wire 252 and collar 306. At FIG. 18D, first end 257 of electrode wire 252 is staked ("stamped") to form cap 256 which fills a remaining volume of pocket 303.

Although center electrode head 254 is illustrated by FIGS. 18A-18D as being attached to center electrode wire 252 via both brazing material 330 and a staking process, in other examples, center electrode head 254 may be attached to center electrode wire 252 using only a brazed connection. In one example, center electrode 250 is formed using pure (e.g., 99.99%) copper. In one example, center electrode head 254 is formed using a nickel-chromium alloy. In one example, braze material 330 is a BCuP series brazing alloy (copper phosphor brazing alloy). It is noted that other suitable materials may be employed. In contrast to a welding process employed by the known spark plug 160, which results in connection between the electrode head and electrode wire only via a weld bead at the tip of the electrode wire, the brazing and threading techniques described herein provide a mechanical and electrical connection between the electrode head and electrode wire along a length of an interface between the electrode wire and the electrode head.

FIGS. 19A-19D are simplified cross-sectional views of portions of spark plug 210 generally illustrating a crimping technique to mechanically connect the electrode wire 252 and electrode head 254 of central electrode 250, according to one example. At FIG. 19A, first end 257 of center electrode wire 252 is positioned within bore 307 of collar 306 extending from electrode plate 300, where an internal diameter of bore 307 is incrementally larger than an external diameter of center electrode wire 252. In one example, as illustrated, bore 307 extends partially through center electrode head 254. In other examples, bore 307 may extend completely through center electrode head 254 (such as illustrated by FIGS. 18A-18D, for example). In one example, a high temperature brazing material 338 (e.g., a powder) is disposed within bore 307. In examples, the brazing material is disposed within bore 307 after insertion of center electrode wire 252 therein.

Figure 19A:
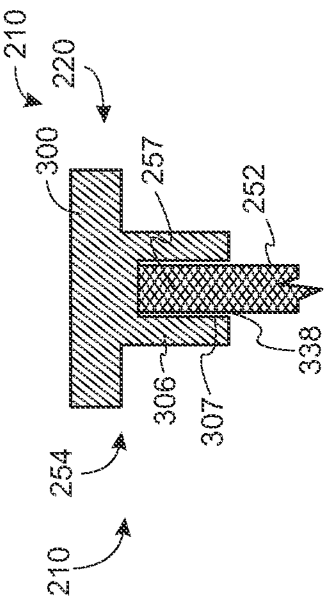
FIGS. 19A-19D are simplified cross-sectional views of portions of a spark plug generally illustrating a crimping technique to mechanically connect an electrode wire to an electrode of a central electrode, according to one example of the present disclosure.
Figure 19B:
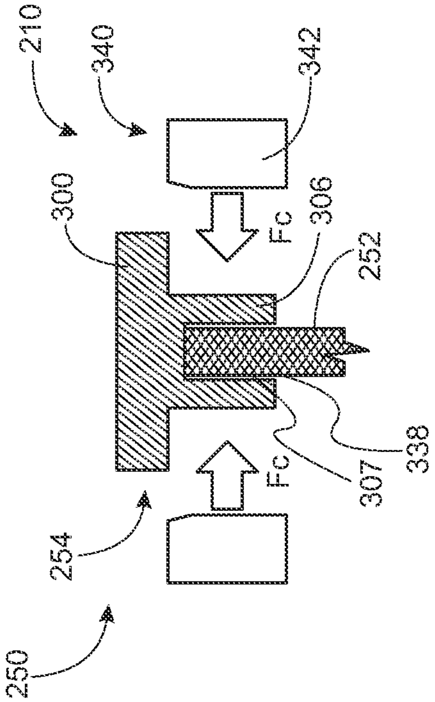
Figure 19C:
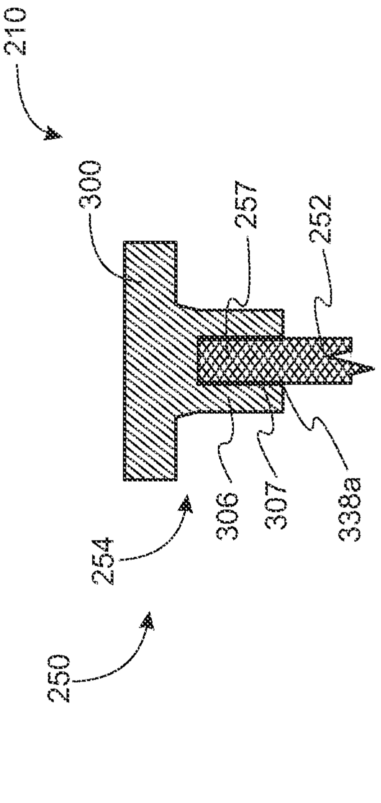

At FIG. 19B, after center electrode wire 252 is positioned within collar bore 307, a crimping apparatus 340, including a compression collar 342, engages and applies a compressive force (illustrated as arrows Fc) to the external perimeter of collar 306. With reference to FIG. 19C, the applied force reshapes collar 306 and reduces the internal diameter of collar bore 307 to press together the interior wall of collar bore 307 and exterior surface of center electrode wire 252 to form a crimped connection there between. In examples, after completion of the crimping process, center electrode 250 is heated to melt and flow the brazing material 338 to eliminate the presence of air between electrode wire 252 and collar bore 306 and to form a brazed connection 338*a* there between (where such brazed connection is in addition to the crimp connection).

Figure 19D:
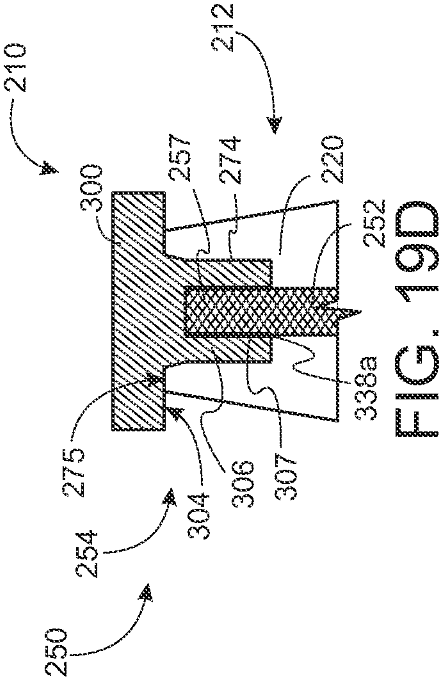

At FIG. 19D, after attachment of electrode wire 252 to electrode head 254, center electrode 250 is inserted into insulative core 212, with collar 306 seated within counter bore 274 of insulative nose 220 and electrode wire 252 extending within central bore 222 to a second end (not illustrated) which is secured via glass lock 262-1 (e.g., see FIG. 17B). In examples, a melting temperature of brazing material 338 is higher than a melting temperature of the material employed to form glass lock 262-1 so that brazed connection 338*a* does not reflow during formation of glass lock 262-1.

In examples, as illustrated, a portion of bottom surface 304 of electrode head 254 is disposed flush with end surface 275 of insulative nose 220 so that electrode wire 252 is not exposed to an external environment (e.g., a combustion chamber).

In some examples, electrode wire 252 comprises copper and electrode head 254 comprises a nickel-chromium alloy. In some examples, the brazing material is a BCuP series brazing alloy (copper phosphor brazing alloy). It is noted that other suitable materials may be employed. In contrast to a welding process employed by the known spark plug 160, which results in connection between the electrode head and electrode wire only via a weld bead at the tip of the electrode wire, the crimping and brazing techniques described herein provide a mechanical and electrical connection between the electrode head and electrode wire along a length of an interface between the electrode wire and the electrode head.

Figure 20A:
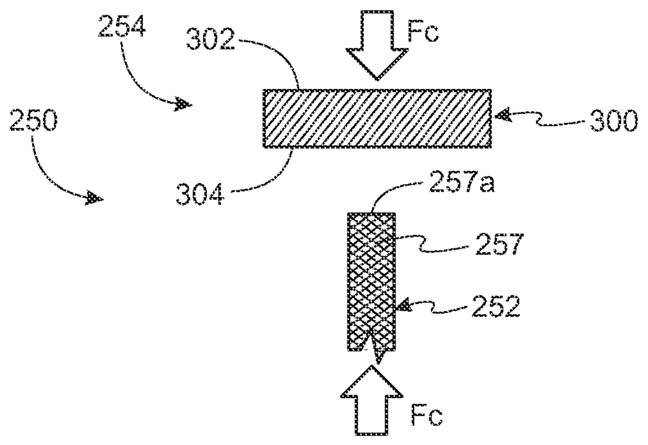
FIGS. 20A-20C are simplified cross-sectional views of portions of a spark plug generally illustrating a cold forming technique to mechanically connect an electrode wire to an electrode of a central electrode, according to one example of the present disclosure.
Figure 20B:
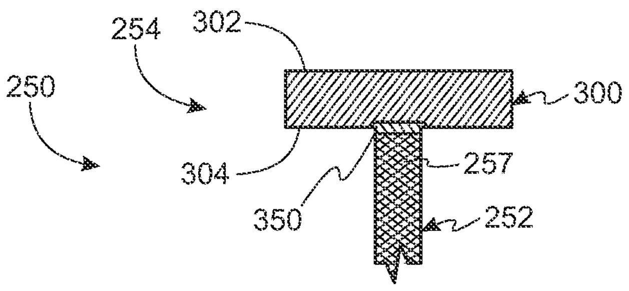
Figure 20C:
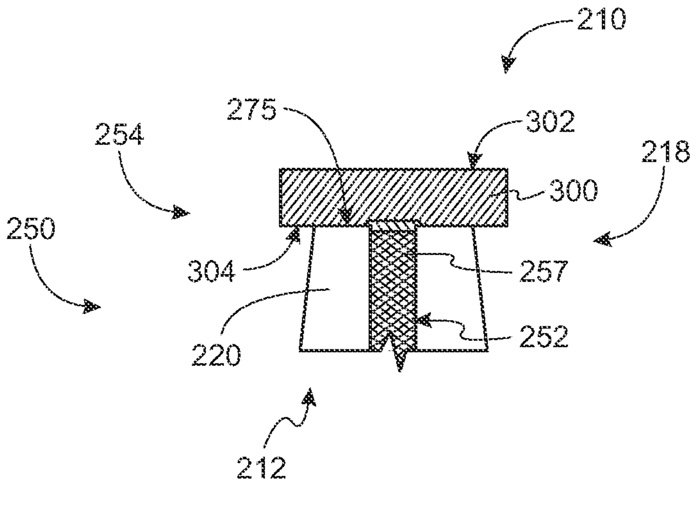

FIGS. 20A-20C are simplified cross-sectional views of portions of spark plug 210 generally illustrating a cold forming technique to mechanically connect the electrode wire 252 and electrode head 254 of central electrode 250, according to one example. According to the example of FIGS. 20A-20C, electrode head 254 of central electrode 250 includes only electrode plate 300 having an upper surface 302 and a bottom surface 304 and no longer includes collar 306. In other examples, not shown, electrode head 254 may include collar 306.

At FIG. 20A, first end 257 of center electrode wire 252 is positioned relative to electrode plate 300 such that an end surface 257*a* of first end 257 of electrode wire 252 is centered on and is facing bottom surface 304 of electrode plate 300. A cold welding machine, not illustrated, is then employed to apply compressive forces Fc (as illustrated by arrows) to press together end surface 257*a* of electrode wire 257 and bottom surface 302 of electrode plate 300 under high pressure to cold weld the electrode wire 252 to electrode plate 300.

Cold welding, also known as cold pressure welding and contact welding, is a sold-state diffusion process where pressure, rather than heat, is employed to join together two or more metal surfaces of suitable metals (e.g., non-ferrous, ductile materials such as copper, nickel, aluminum, silver, silver alloys and gold, to name a few) under vacuum conditions. When held together under a high enough pressure, at a microstructural level, electrons transfer between metal atoms of the two surfaces to create a metallurgical bond there between, the strength of which may be close to, if not the same, as the parent metal(s). Cold welding may be employed on the same or dissimilar metals. Unlike traditional "hot" welding processes, cold welding does not create a heat-affected-zone, which weakens the metal's structure. Additionally, cold welding reduces and or eliminates deformation and/or warping of the metals.

As illustrated at FIG. 20B, upon completion of the cold welding process, a metallurgical joint 350 mechanically connects first end 257 of electrode wire 252 to bottom surface 304 of electrode plate 300. At FIG. 20C, center electrode 250 is inserted into insulative core 212 with electrode wire 252 extending within central bore 222 to a second end (not illustrated) which is secured via glass lock 262-1 (e.g., see FIG. 17B). In examples, as illustrated, a portion of bottom surface 304 of electrode head 254 is disposed flush with end surface 275 of insulative nose 220 so that electrode wire 252 is not exposed to an external environment (e.g., a combustion chamber).

In some examples, electrode wire 252 comprises copper and electrode head 254 comprises a nickel-chromium alloy. It is noted that other suitable cold welding materials may be employed. In contrast to a welding process employed by the known spark plug 160, which results in connection between the electrode head and electrode wire only via a weld bead at the tip of the electrode wire, the cold welding technique described herein provides a brazeless mechanical and electrical connection between the electrode head and electrode wire, the strength of which is not susceptible to heat degradation.

As described above, spark plugs are configured to operate within an industry-standard temperature range (e.g., approximately 600° C. to 850° C.) with engines typically specifying a temperature rating of spark plugs to be used therewith to ensure optimal performance. With this in mind, spark plugs are typically designated with a temperature rating indicative of a temperature or range of temperatures (commonly referred to as a "heat range") at which the spark plug is designed to operate. A so-called "hot" plug is configured to transfer heat from the electrode head at a rate which results in the spark plug operating in an upper portion of the standard temperature range, and a "cold" plug is configured to transfer heat from the electrode heat at a rate which results in the spark plug operating in a lower portion of the standard temperature range.

Figure 21A:
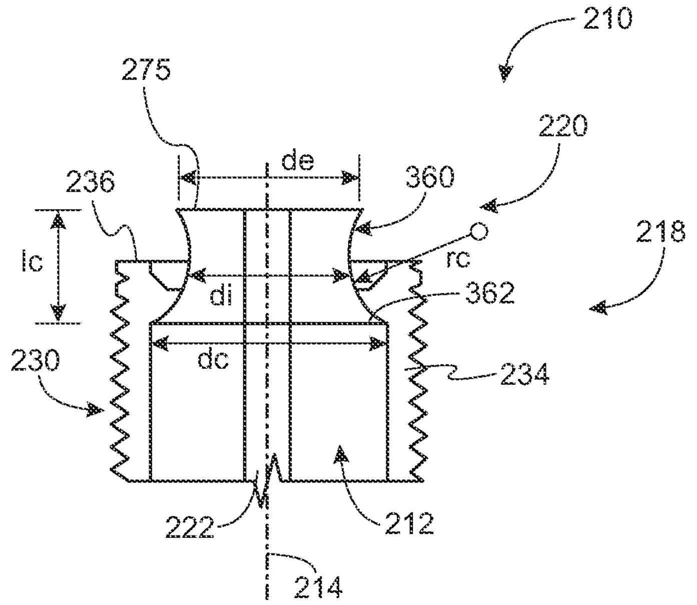
FIGS. 21A and 21B are cross-sectional views generally illustrating portions of firing end of a spark plug, including an insulator nose, according to one example the present disclosure.
Figure 21B:
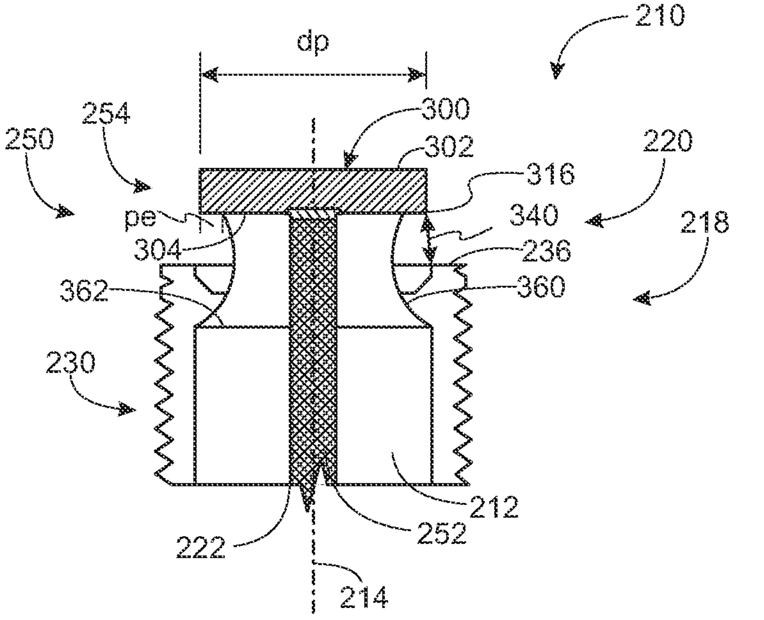

FIGS. 21A and 21B are cross-sectional views generally illustrating portions of firing end 218 of spark plug 210, including an implementation of insulator nose 220, according to one example of the present disclosure. In accordance with the present disclosure, insulator nose 220 is structured to extend axially beyond side electrode 236 of metal shell 230 and to support center electrode head 254 within a combustion chamber of an internal combustion engine and reduce vibrational and turbulent forces on electrode head 254. In some examples, insulator nose is structured to enable distribution and circulation of fluid (e.g., fuel and air) within the combustion chamber, and represents a design feature for defining a temperature rating of spark plug 210, wherein the temperature rating of spark plug 210 may be adjusted by adjusting a volume of insulating material of insulating nose 220 which is disposed within the combustion chamber when the spark plug is installed in an internal combustion engine. The volume of insulating material of insulative nose 220 within the combustion chamber determines an amount of hot combustion gases able to be contained within the shell of the spark plug which, in-turn, determines a temperature rating of the spark plug. The greater the volume of material of insulative nose 220, the greater the displacement of combustion gases and the cooler the operating temperature of the spark plug. Likewise, the lesser the volume of material of insulative nose 220, the lesser the displacement of combustion gases and the hotter the operating temperature of the spark plug.

According to one example, as illustrated, insulative core 212 extends axially along, and symmetrically about axial centerline 214, with insulative nose 220 extending along axial centerline 214 from a transition location 362 along the length of insulative core 212 to an end surface 275 of insulative core 212 at firing end 218 of spark plug 210. Transition location 362 represents a delineation point of insulative nose 220 from a remaining portion of the insulative core 212 (i.e., the remaining portion extending from the transition location 362 to the terminal end of insulative core 212).

In one example, at least a portion of insulative nose 220 extends beyond metal shell 230 to end surface 275. Central bore 212 extends axially through the length of insulative core 212 and is coincident with axial centerline 214. In accordance with the present disclosure, a cross-sectional area of insulative nose 212 (normal to axial centerline 214) varies over its length, lc, with at least a portion of insulative nose 212 between end surface 275 and transition location 362 having a cross-sectional area less than a cross-sectional area at end surface 275 and/or less than a cross-sectional area at transition location 362. In one example, at least a portion of a perimeter exterior surface 360 of insulative nose 220 extending between end surface 275 and transition location 362 has a concave profile.

In examples, a transverse dimension of insulative nose 212 (the transverse dimension being normal to axial centerline 214) varies across the length, lc, of insulative nose 220, with the transverse dimension at end surface 275 being greater than an intermediate transverse dimension of at least a portion of insulative nose 220 (between end surface 275 and transition location 362). In one example, as illustrated, where insulative nose 212 is cylindrical in shape, such transverse dimension is a diameter of insulative nose 220. In one example, an intermediate diameter, di, of insulative nose 220 varies between a diameter, dc, of insulative nose 220 at transition location 362 and a diameter, de, at end surface 275 so that perimeter surface 360 has a concave, curvilinear profile. In one example, perimeter surface 360 has a semi-circular profile having a range of curvature, rc. In other examples, curvilinear perimeter surface 360 may have a profile of any number of shapes other than semi-circular, such as elliptical, or stepped (e.g., see FIG. 24), for instance.

In examples, as illustrated by FIG. 21B, center electrode wire 252, such as center electrode wire 252 of center electrode 250 of FIGS. 20A-20C, is received within central bore 212 with lower surface 304 of electrode plate 300 disposed so as to be flush with end surface 275 of insulative nose 220. In one example, as illustrated, the diameter, dc, of end surface 275 is less than a diameter, dp, of electrode plate 300 so that a ring-like perimeter edge portion, pe, of lower surface 304 of electrode plate 300 is exposed from insulative nose 220 such that a spark gap 340 is formed between a circumferential edge 316 of lower surface 304 of electrode plate 300 and side electrode 236.

In examples, the dimensions of insulator nose 220 can be adapted during manufacture to obtain a desired design operating temperature rating of spark plug 210. For example, the diameter, de, of end surface 275 of insulator nose 275 can be adjusted to cover more or less of the lower surface 304 of electrode plate 300, wherein an operating temperature range of spark plug 210 is inversely proportional to the amount of surface area of lower surface 304 which is covered by insulative nose 220 (i.e., the greater the amount of surface are of lower surface 104 which is covered by insulative nose, the less the amount of surface area of electrode plate 300 which is exposed to an engine combustion chamber and able to directly absorb heat, and vice-versa).

In examples, end surface 275 of insulative nose 220 provides structural support to electrode plate 300, wherein the greater the diameter, de, of end surface 275 the greater the support provided to electrode plate 300. In examples, by employing a concave, curvilinear shape for perimeter surface 360, for a given diameter, de, of end surface 275, the design temperature range of spark plug 210 can be adjusted by adjusting the intermediate diameters, di, of insulative nose 212 to adjust a degree of concavity of perimeter surface 360, wherein the greater the degree of concavity, the less the amount of material of insulative nose disposed within the combustion chamber and the greater the design temperature range (and vice-versa).

In examples, the greater the volume of material of insulative nose 220 disposed within the combustion chamber for a given length, lc, of insulative nose 220, the "cooler" the temperature rating of the spark plug, and the greater the degree of concavity, the "hotter" the temperature rating of the spark plug. By employing a concave shape for perimeter surface 360 of insulative nose 220, insulative nose 220 can provide a high degree of structural support of electrode plate 300 via end surface 275 while enabling spark plug 210 to be designed to with a desired temperature rating via adjustment of the degree of concavity of perimeter surface 360.

Figure 22A:
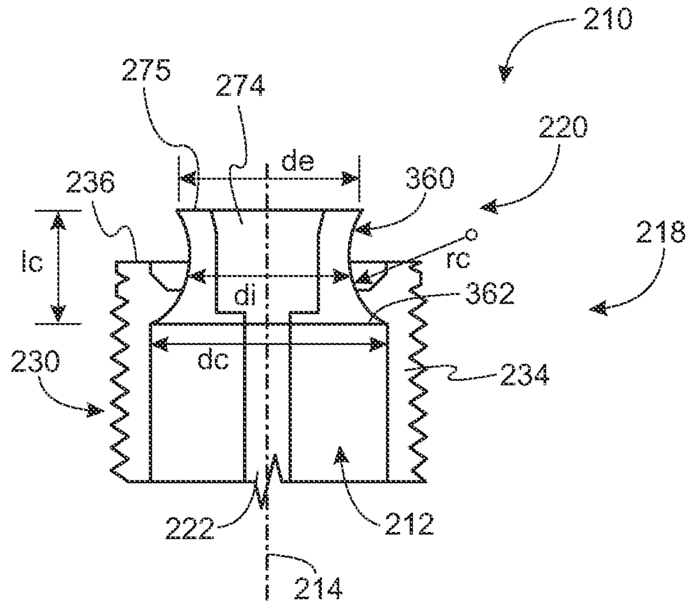
FIGS. 22A and 22B are cross-sectional views generally illustrating portions of firing end of a spark plug, including an insulator nose, according to one example the present disclosure.
Figure 22B:
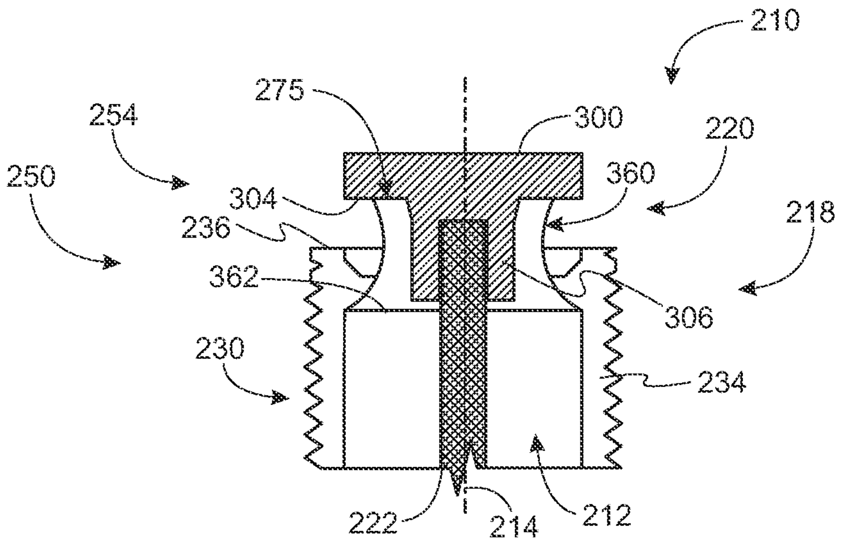

FIGS. 22A and 22B are cross-sectional views generally illustrating portions of firing end 218 of spark plug 210 similar to that illustrated by FIGS. 21A and 21B, except that insulative nose 220 further includes an axially extending counter bore 274 concentric with central bore 222, wherein counter bore 274 has an internal diameter greater an internal diameter of central bore 222 (e.g., see internal diameters d3 and d2 of FIG. 2B). As illustrated by FIG. 22B, counter bore 274 is configured to receive an electrode plate collar, such as electrode plate collar 306 of electrode plate 300 of center electrode 250 of FIGS. 19A-19D, for example, such that surface 304 of electrode plate 300 disposed so as to be flush with end surface 275 of insulative nose 220.

Figure 23:
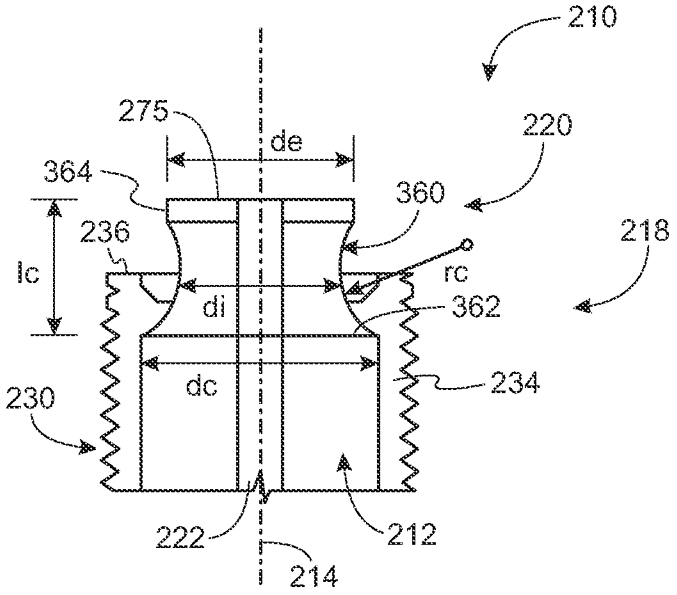
FIG. 23 is a cross-sectional view generally illustrating insulative nose of a spark plug, according to one example.

FIG. 23 is a cross-sectional view generally illustrating insulative nose 220, according to one example. Insulative nose 220 of FIG. 23 is similar to that illustrated and described by FIGS. 21A and 21B, but further includes a plate-like end portion 364 defining end surface 275 for supporting electrode plate 300 (e.g., see FIG. 21B). In the example of FIG. 23, insulative nose 220 includes a concave, curvilinear perimeter surface 360 extending between plate-line end portion 364 and transition location 362.

Figure 24:
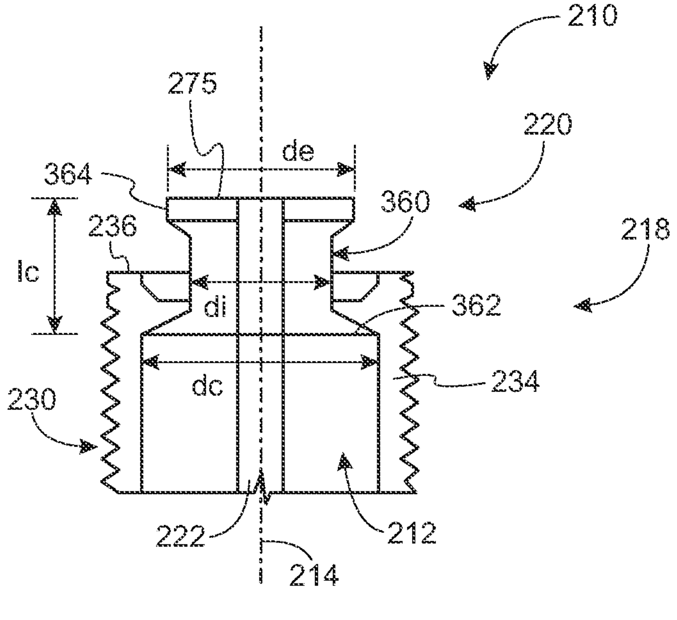
FIG. 24 is a cross-sectional view generally illustrating insulative nose of a spark plug, according to one example.

FIG. 24 is a cross-sectional view generally illustrating insulative nose 220, according to one example. Insulative nose 220 of FIG. 24 is similar to insulative nose 220 of FIG. 23, but concave perimeter surface 360 is formed with a "step-like" profile in lieu of a curvilinear profile. As noted above, concave perimeter surface 360 may be defined using any number of suitable profiles, such as curvilinear and stepped profiles, as illustrated as examples herein, where the concave perimeter surface 360 enables insulative nose 220 to serve as a pedestal for supporting electrode plate 300 of center electrode 250 while enabling spark plug 210 to be configured with a selected temperature rating (e.g., as a "hot" plug or "cold" plug) via adjustment of an amount of material of insulative nose 220 (e.g., ceramic) which is disposed within a combustion chamber. The concave perimeter surface 360 also enables better circulation of fluid (e.g., fuel air mixture) about firing end 218 of spark plug 210 when disposed within a combustion chamber.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

What is claimed is:

1. A spark plug comprising:
a terminal end;
a firing end;
an axial centerline extending between the terminal end and the firing end;
an insulative core extending between the terminal end and the firing end, the insulative core including:
a central bore coincident with the axial centerline extending through the insulative core; and
an insulative nose extending along the axial centerline at the firing end of the insulative core, the insulative nose having an axial length and defining an end surface of the insulative core, wherein a cross-sectional area of the insulative nose perpendicular to the axial centerline varies along the axial length of the insulative nose with a cross-sectional area of the insulative nose along at least a portion of the axial length of the insulative nose being less than a surface area of the end surface so that at least a portion of a perimeter surface along the axial length of the insulate nose has a concave profile.

2. The spark plug of claim 1, wherein temperature rating of the spark plug is proportional to an amount of concavity of the concave profile, whereby the greater the amount of concavity the higher the temperature rating.

3. The spark plug of claim 1, wherein the insulative nose is cylindrical along the axial centerline, wherein a diameter of the insulative core varies along at least the portion of the axial length of the insulative nose.

4. The spark plug of claim 1, wherein the concave profile is a curvilinear profile.

5. The spark plug of claim 4, wherein the curvilinear profile is semicircular with a radius of curvature.

6. The spark plug of claim 4, wherein in the curvilinear profile is elliptical.

7. The spark plug of claim 1, wherein the concave profile is a stepped profile.

8. The spark plug of claim 1, wherein for a given axial length of the insulative nose, a temperature rating of spark plug is inversely related to a volume of material of the insulative nose.

9. The spark plug of claim 8, wherein at least a portion of the insulative core is disposed within a metal shell, wherein at least a portion of the insulative nose extends axially beyond the metal shell at the firing end.

10. The spark plug of claim 9, wherein the perimeter surface of the insulative nose spaced apart from an interior surface of the metal shell.

11. The spark plug of claim 1, further comprising a center electrode including:

an electrode wire; and an electrode head, in a plane perpendicular to the axial centerline, the electrode head having a cross-sectional area greater than an area of the end surface of the insulative nose, the electrode wire extending from a bottom side of the electrode head into the central bore at the insulative nose to form an electrical and thermal pathway with the electrode head, and wherein a portion of the bottom surface of the electrode head is mounted flush with the end surface of the insulative nose such that the electrode wire is unexposed to the environment.

12. The spark plug of claim 11, wherein:

the insulative core includes a counter bore coincident with the axial centerline and extending axially into the insulative nose toward the terminal end, the counter bore having a diameter greater than a diameter of the central bore; and the electrode head includes a collar extending from the bottom side of the electrode head, the collar including an axially extending collar bore coincident with the axial centerline, the collar seated in the counter bore with the first end of the electrode wire disposed within the collar bore.

13. The spark plug of claim 1, wherein a remaining portion of the insulative core extends from the insulative nose toward the terminal end.

14. A spark plug comprising:

a terminal end;

a firing end;

an axial centerline extending between the terminal end and the firing end; and an insulative core extending symmetrically about the axial centerline between the terminal end and the firing end, the insulative core including:

an insulative nose extending along and symmetrically about the axial centerline at the firing end of the insulative core, the insulative nose having an axial length and defining an end surface of the insulative nose, wherein a perimeter surface of the insulative nose has a concave curvilinear shape over at least a portion of the axial length.

15. The spark plug of claim 14, further including:

a central bore coincident with the axial centerline and extending through the insulative core; and a center electrode including:

an electrode head having a bottom surface; and an electrode wire extending from the bottom surface of the electrode head, wherein the electrode wire is disposed within the central bore and the bottom surface of the electrode head is disposed on the end surface of the insulative nose, the bottom surface of the electrode head having a surface area greater than a surface area of the end surface.

16. The spark plug of claim 15, further including:

a metal shell disposed about a circumference of a portion of the insulative core, wherein at least a portion of the insulative nose extends axially beyond the metal shell to the end surface at the firing end, wherein a circular spark gap is formed between a circumferential edge of the electrode head and a circumferential edge of the metal shell.

17. An insulative core for a spark plug, the insulative core including:

an axial centerline extending between a terminal end and a firing end a central bore coincident with the axial centerline extending through the insulative core; and an insulative nose extending along and symmetrically about the axial centerline at the firing end of the insulative core, the insulative nose having an axial length and defining an end surface of the insulative nose at the firing end, wherein a perimeter surface of the insulative nose has a concave curvilinear shape over at least a portion of the axial length, the central bore to receive a center electrode wire of a center electrode of the spark plug with the end surface to be in contact with and support a bottom surface of an electrode head of the center electrode.

18. The insulative core of claim 17, wherein temperature rating of the spark plug is proportional to an amount of concavity of the concave profile, whereby the greater the amount of concavity the higher the temperature rating.

19. The insulative core of claim 17, the concave curvilinear shape having a radius of curvature.

20. The insulative core of claim 17, the insulative nose having a counter bore coincident with the axial centerline and extending axially into the insulative nose from the end surface toward the terminal end, the counter bore having a diameter greater than a diameter of the central bore, the counter bore to receive a collar extending from the bottom surface of the electrode head.

* * * * *